(12) United States Patent
Carruthers et al.

(10) Patent No.: US 8,539,781 B2
(45) Date of Patent: Sep. 24, 2013

(54) COMPONENT FOR SOLAR ADSORPTION REFRIGERATION SYSTEM AND METHOD OF MAKING SUCH COMPONENT

(75) Inventors: J. Donald Carruthers, Fairfield, CT (US); Karl Boggs, Hopewell Junction, NY (US); Luping Wang, Brookfield, CT (US); Shaun Wilson, Cheshire, CT (US); Jose I. Arno, Brookfield, CT (US); Paul J. Marganski, Seymour, CT (US); Steven M. Bilodeau, Oxford, CT (US); Peng Zou, Brookfield, CT (US); Brian Bobita, Danbury, CT (US); Joseph D. Sweeney, Winsted, CT (US); Douglas Edwards, Danbury, CT (US)

(73) Assignee: Advanced Technology Materials, Inc., Danbury, CT (US)

(*) Notice: Subject to any disclaimer, the term of this patent is extended or adjusted under 35 U.S.C. 154(b) by 654 days.

(21) Appl. No.: 12/666,208
(22) PCT Filed: Jun. 22, 2008
(86) PCT No.: PCT/US2008/067824
§ 371 (c)(1),
(2), (4) Date: Sep. 29, 2010
(87) PCT Pub. No.: WO2009/002893
PCT Pub. Date: Dec. 31, 2008

(65) Prior Publication Data
US 2011/0048063 A1    Mar. 3, 2011

Related U.S. Application Data

(60) Provisional application No. 60/936,876, filed on Jun. 22, 2007, provisional application No. 60/951,137, filed on Jul. 20, 2007.

(51) Int. Cl.
F25B 15/00    (2006.01)
(52) U.S. Cl.
USPC ............................................. 62/112; 62/476

(58) Field of Classification Search
USPC .................. 62/79, 112, 476, 480; 502/400, 502/402, 416; 252/71
See application file for complete search history.

(56) References Cited

U.S. PATENT DOCUMENTS 2,423,702 A    7/1947 Hart
2,649,700 A    8/1953 Piper
(Continued)

FOREIGN PATENT DOCUMENTS

EP    1 064 996 A1    1/2001
JP    56-158126 A    12/1981
(Continued)

OTHER PUBLICATIONS

Unpublished U.S. Appl. No. 11/913,553.
(Continued)

Primary Examiner — Mohammad M Ali
(74) Attorney, Agent, or Firm — Hultquist, PLLC; Steven J. Haltquist; Rosa Yaghmour

(57) ABSTRACT

An adsorption structure is described that includes at least one adsorbent member formed of an adsorbent material and at least one porous member provided in contact with a portion of the adsorbent member to allow gas to enter and exit the portion of the adsorbent member. Such adsorption structure is usefully employed in adsorbent-based refrigeration systems. A method also is described for producing an adsorbent material, in which a first polymeric material is provided having a first density and a second polymeric material is provided having a second density, in which the second polymeric material is in contact with the first polymeric material to form a structure. The structure is pyrolyzed to form a porous adsorbent material including a first region corresponding to the first polymeric material and a second region corresponding to the second polymeric material, in which at least one of the pore sizes and the pore distribution differs between the first region and the second region.

17 Claims, 20 Drawing Sheets

(56) References Cited

U.S. PATENT DOCUMENTS

| | | | |
|---|---|---|---|
| 3,668,881 A * | 6/1972 | Thibault et al. | 62/55.5 |
| 4,040,990 A | 8/1977 | Neely | |
| 4,302,224 A | 11/1981 | McCombs et al. | |
| 5,110,328 A | 5/1992 | Yokota et al. | |
| 5,110,422 A | 5/1992 | Alperine et al. | |
| 5,485,675 A | 1/1996 | Jones et al. | |
| 5,518,528 A | 5/1996 | Tom et al. | |
| 5,614,459 A | 3/1997 | Mondragon et al. | |
| 5,704,965 A | 1/1998 | Tom et al. | |
| 5,704,967 A | 1/1998 | Tom et al. | |
| 5,707,424 A | 1/1998 | Tom et al. | |
| 5,761,910 A | 6/1998 | Tom et al. | |
| 5,837,027 A | 11/1998 | Olander et al. | |
| 5,842,350 A * | 12/1998 | Spinner et al. | 62/86 |
| 5,851,270 A | 12/1998 | Olander | |
| 5,858,067 A | 1/1999 | Mcmanus | |
| 5,876,487 A | 3/1999 | Dahlgren et al. | |
| 5,882,384 A | 3/1999 | Tom et al. | |
| 5,916,245 A | 6/1999 | Tom et al. | |
| 5,917,140 A | 6/1999 | Tom | |
| 5,935,305 A | 8/1999 | Tom et al. | |
| 5,961,697 A | 10/1999 | McManus et al. | |
| 5,985,008 A | 11/1999 | Tom | |
| 5,993,766 A | 11/1999 | Tom et al. | |
| 6,019,823 A | 2/2000 | Tischler et al. | |
| 6,027,547 A | 2/2000 | Tom | |
| 6,041,617 A | 3/2000 | Sanada et al. | |
| 6,110,257 A | 8/2000 | Tom | |
| 6,125,131 A | 9/2000 | Brandes et al. | |
| 6,132,492 A | 10/2000 | Hultquist et al. | |
| 6,204,180 B1 | 3/2001 | Tom et al. | |
| 6,309,446 B1 | 10/2001 | Nakanoya et al. | |
| 6,393,862 B1 * | 5/2002 | Sullivan | 62/475 |
| 6,406,519 B1 | 6/2002 | Tom et al. | |
| 6,540,819 B2 | 4/2003 | Tom et al. | |
| 6,592,653 B2 | 7/2003 | Wang et al. | |
| 6,660,063 B2 | 12/2003 | Tom et al. | |
| 6,716,271 B1 | 4/2004 | Arno et al. | |
| 6,743,278 B1 | 6/2004 | Carruthers | |
| 6,764,755 B2 | 7/2004 | Tom et al. | |
| 6,939,394 B2 | 9/2005 | Carruthers | |
| 6,991,671 B2 | 1/2006 | Brestovansky et al. | |
| 7,182,802 B2 * | 2/2007 | Bause et al. | 95/146 |
| 7,410,585 B2 * | 8/2008 | Rohrbach et al. | 210/633 |
| 7,494,530 B2 | 2/2009 | Carruthers | |
| 2002/0194989 A1 | 12/2002 | Tuma et al. | |
| 2005/0014643 A1 | 1/2005 | Lini et al. | |
| 2006/0011064 A1 * | 1/2006 | Carruthers | 96/108 |
| 2007/0031325 A1 | 2/2007 | Carruthers et al. | |
| 2008/0302246 A1 | 12/2008 | Carruthers et al. | |
| 2009/0188392 A1 | 7/2009 | Carruthers | |

FOREIGN PATENT DOCUMENTS

| | | |
|---|---|---|
| JP | 60-150831 A | 8/1985 |
| JP | 06-002984 A | 1/1994 |
| JP | 08-200876 A | 8/1996 |
| JP | 8-313105 A | 11/1996 |
| JP | 10-141803 A | 5/1998 |
| JP | 10-185353 A | 7/1998 |
| JP | 10-286460 A | 10/1998 |
| JP | 11082891 A | 3/1999 |
| JP | 11-166772 A1 | 6/1999 |
| JP | 2001287905 A | 10/2001 |
| JP | 2004-261739 A | 9/2004 |
| JP | 2005-127683 A | 5/2005 |
| JP | 2007-132614 A | 5/2007 |
| WO | 9624435 A1 | 8/1996 |
| WO | 02051525 A1 | 7/2002 |
| WO | 2007136887 A2 | 11/2007 |

OTHER PUBLICATIONS

Sing, K. S. W., et al., "Reporting Physisorption Data for Gas/Solid Systems with Special Reference to the Determination of Surface Area . . . ", "Pure Appl. Chem.", 1985, pp. 603-619, vol. 57, No. 4.

\* cited by examiner

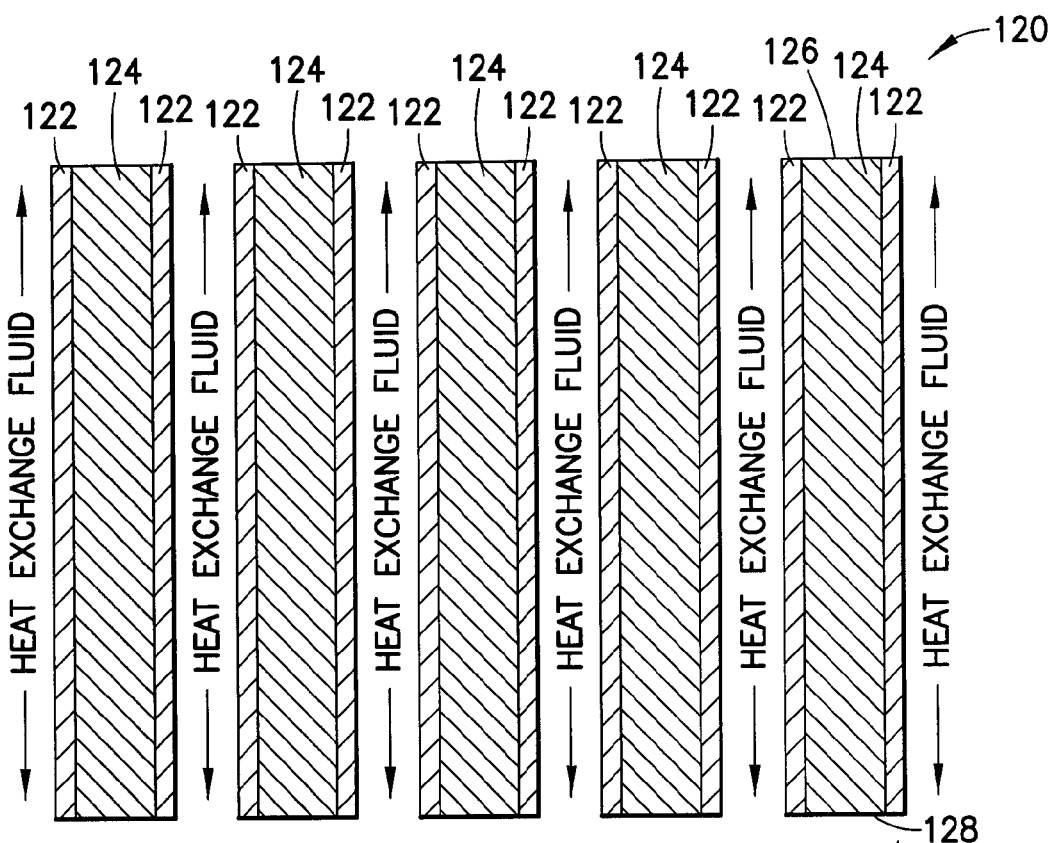
FIG.2
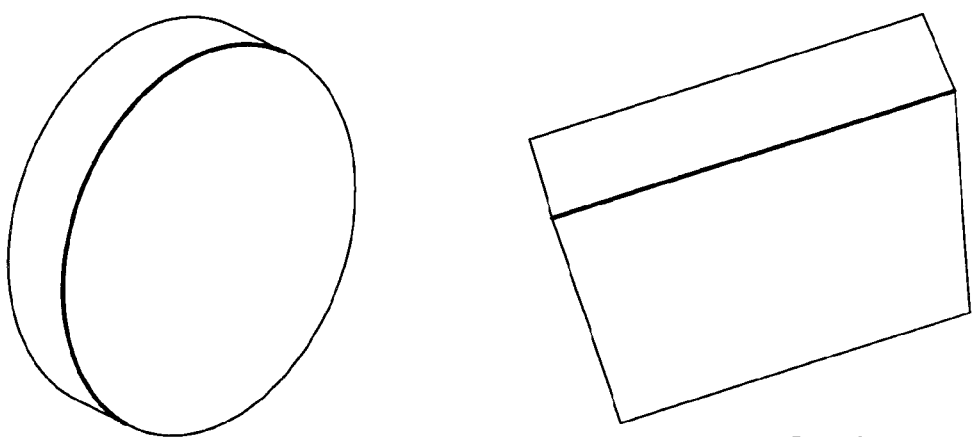
FIG.3
FIG.4

COMPONENT FOR SOLAR ADSORPTION REFRIGERATION SYSTEM AND METHOD OF MAKING SUCH COMPONENT

CROSS-REFERENCE TO RELATED APPLICATIONS

This application is a U.S. national phase under the provisions of 35 U.S.C. §371 of International Application No. PCT/US08/67824 filed Jun. 22, 2008, which in turn claims the benefit of priority of U.S. Provisional Patent Application 60/936,876 filed Jun. 22, 2007 and the benefit of priority of U.S. Provisional Patent Application 60/951,137 filed Jul. 20, 2007 under the provisions of 35 USC 119. The disclosures of International Application No. PCT/US08/67824, U.S. Provisional Patent Application 60/936,876, and U.S. Provisional Patent Application 60/951,137 are hereby incorporated herein by reference, in their respective entireties, for all purposes.

FIELD OF THE INVENTION

The present invention relates generally to the field of heat pumps or systems (e.g., refrigeration systems), materials for use in such systems, and methods of producing such materials. More specifically, the present invention relates to adsorbent materials for use in adsorption refrigeration systems and methods of making such materials.

DESCRIPTION OF THE RELATED ART

Refrigerators used for storing food, medicine, and other items at low temperatures generally include an insulated structure or container that is cooled using electrically-operated mechanical compressors in a vapor compression cycle. A coolant or refrigerant (e.g., Freon® heat transfer fluid) in gaseous or vapor form is introduced into a compressor, which compresses the refrigerant (and, as a result, heats the vapor). A condenser removes excess heat from the vapor and condenses the vapor into a liquid at its boiling point. The high-pressure refrigerant then passes through an expansion valve, where its pressure abruptly decreases. This sudden pressure decrease results in flash evaporation and cooling of the refrigerant. The cooled refrigerant then travels through an evaporator coil within the unit that absorbs heat, which cools the contents of the insulated container. The refrigerant vapor then returns to the compressor inlet to complete the thermodynamic cycle.

The compressors and other components of such a refrigerator require electrical power to operate, which is conventionally provided by AC outlets and the like. Where no source of AC power is readily available, as in the case of refrigerators intended for use in mobile applications (i.e., where the refrigerator may be moved from location to location), other power sources may be utilized such as engines (e.g., diesel engines) and generators. However, mobile refrigeration systems that rely on engines and generators for power are relatively large, heavy, and expensive to operate. For example, a source of fuel such as gasoline is typically required to run an engine having sufficient output to power the unit, which may not be readily available and/or may be relatively costly to obtain. The systems may also take up a relatively large amount of space to accommodate the electromechanical systems conventionally employed.

Adsorption-based refrigeration systems, in which an adsorbent material is used to adsorb and desorb a refrigerant fluid (e.g., gas) during the refrigeration cycle, represent a possible alternative for mobile refrigeration systems. Adsorbent materials previously used in adsorbent-based refrigeration and/or other applications, however, may have sub-optimal properties in refrigeration applications in which relatively quick adsorption and desorption cycling times are required.

SUMMARY OF THE INVENTION

The present invention relates in various aspects to systems useful for refrigeration, materials, e.g., adsorbents, that are utilizable therein, and methods of making and using such materials and systems.

In one aspect, the invention relates to an adsorption structure comprising: at least one adsorbent member formed of an adsorbent material; and at least one porous member provided in contact with a portion of the adsorbent member to allow gas to enter and exit the portion of the adsorbent member.

In a further aspect, the invention relates to a method for producing an adsorption structure comprising: providing a porous material in contact with a surface of an adsorbent material, the adsorbent material being configured to allow storage and transfer of a refrigerant fluid, whereby the porous material allows the refrigerant fluid to traverse the surface of the adsorbent material and providing at least one heat conductive member in contact with the adsorbent member, the heat conductive member being configured for transferring heat between the adsorbent material and a heat transfer fluid.

Still another aspect to them as relates to an adsorbent-based refrigeration system comprising: an adsorption structure comprising at least one adsorbent member, at least one porous member in contact with the at least one adsorbent member, and a heat conductive member provided in contact with the adsorbent member; wherein the heat conductive member is configured to transfer heat to and from the adsorbent member; and wherein the porous metal member is configured to allow refrigerant fluid to enter and exit the adsorbent material.

In a further aspect, the invention relates to a method for producing an adsorbent material comprising: providing a first activated carbon precursor having a first density; providing a second activated carbon precursor having a second density in contact with the first activated carbon precursor to form a structure; and pyrolyzing the structure to form an adsorbent material that includes a plurality of pores therein, the adsorbent material comprising a first region corresponding to the first activated carbon precursor and a second region corresponding to the second activated carbon precursor; wherein at least one of the pore sizes and the pore distribution differ between the first region and the second region.

Yet another aspect of the invention relates to a method of forming an adsorbent member comprising: forming a first polymeric member; forming a second polymeric member; providing the first polymeric member in contact with the second polymeric member, at least one of the first polymeric member and the second polymeric member being configured such that spaces are provided between the first polymeric member and the second polymeric member; and pyrolyzing the first member and the second member to form relatively small pores within the first member and the second member and to form larger pores at locations corresponding to the spaces.

In another aspect, the invention relates to a method of forming an adsorbent member comprising: providing a member comprising a first material provided within a polymeric matrix; removing the first material; and pyrolyzing the member to form pores within the polymeric matrix.

A still further aspect of the invention relates to an adsorbent material comprising: a first region having a first pore distribution; a second region having a second pore distribution; wherein the first region is formed from a first polymeric material having a first density and the second region is formed from a second polymeric material having a second density.

The invention in another aspect relates to a method of increasing loading capacity of a carbon adsorbent for a sorbate gas, comprising maintaining the carbon adsorbent at elevated temperature and elevated pressure conditions in a sorbate gas environment, for sufficient time to increase loading of the sorbate gas on the carbon adsorbent.

Other aspects, features and embodiments of the invention will be more fully apparent from the ensuing disclosure and appended claims.

BRIEF DESCRIPTION OF THE DRAWINGS

FIG. 2 is a cross-sectional view of an adsorption device provided as part of the refrigeration system illustrated schematically in FIG. 1.

FIGS. 3-4 are photographs illustrating activated carbon monoliths according to an exemplary embodiment.

DETAILED DESCRIPTION OF THE INVENTION, AND PREFERRED EMBODIMENTS THEREOF

The present invention relates in various aspects to systems useful for refrigeration, materials, e.g., adsorbents, that are utilizable therein, and methods of making and using such materials and systems. Although the invention is described hereinafter in various embodiments, with respect to specific features and elements, it is to be recognized that the system, apparatus, compositions, processes and methodologies of the invention may be constituted in various forms and arrangements by modified variants utilizing any of various combinations and permutations of such disclosed features and elements, and such variant forms and arrangements are to be regarded as being disclosed as though expressly described herein.

In various embodiments of the invention, adsorbent materials are provided for use in heat pumps and systems, and in particular for use in an adsorption-based refrigeration system (e.g., a mobile refrigeration device). The adsorbent materials include a pore structure that is intended to allow relatively quick adsorption and desorption of refrigerant fluid (e.g., gas) during a refrigeration cycle. These adsorbent materials can be used in applications and systems where adsorption/desorption rates limit the transfer of fluid (e.g., heat pumps, refrigerators, etc.). According to an exemplary embodiment, features such as porous metal or ceramic plates and the like (which may also be heat conductive) can be provided adjacent to one or more surfaces of the adsorbent material to allow a fluid to enter and exit the adsorbent material through the surface. According to another exemplary embodiment, the pore structure of the adsorbent material may be controlled such that it may be better suited to refrigeration-based applications.

Adsorption-based refrigeration systems require less energy to operate and can be smaller and/or lighter than conventional refrigeration systems that employ electromechanical systems. Instead of relying on conventional vapor compression systems and energy supplies as are used with conventional refrigeration systems, the adsorption-based refrigeration system can utilize primarily thermal solar power or a supply of waste heat and a thermal compressor system.

According to an exemplary embodiment, the refrigeration system generates refrigeration using a solid adsorbent and a working fluid in a thermally driven sorption cycle to achieve refrigerant compression. Since it operates on thermal energy rather than electricity, the electrical load of the system can be dramatically reduced. Such a system can provide enhanced reliability due to the use of different component subsystems (e.g. thermal vs. photovoltaic, and thermal compression vs. mechanical compression), improved coefficient of performance (COP) of the system at a given specific cooling power (SCP), and a reduced projected cost for system as compared to electromechanical-based refrigeration systems.

Figure 1:
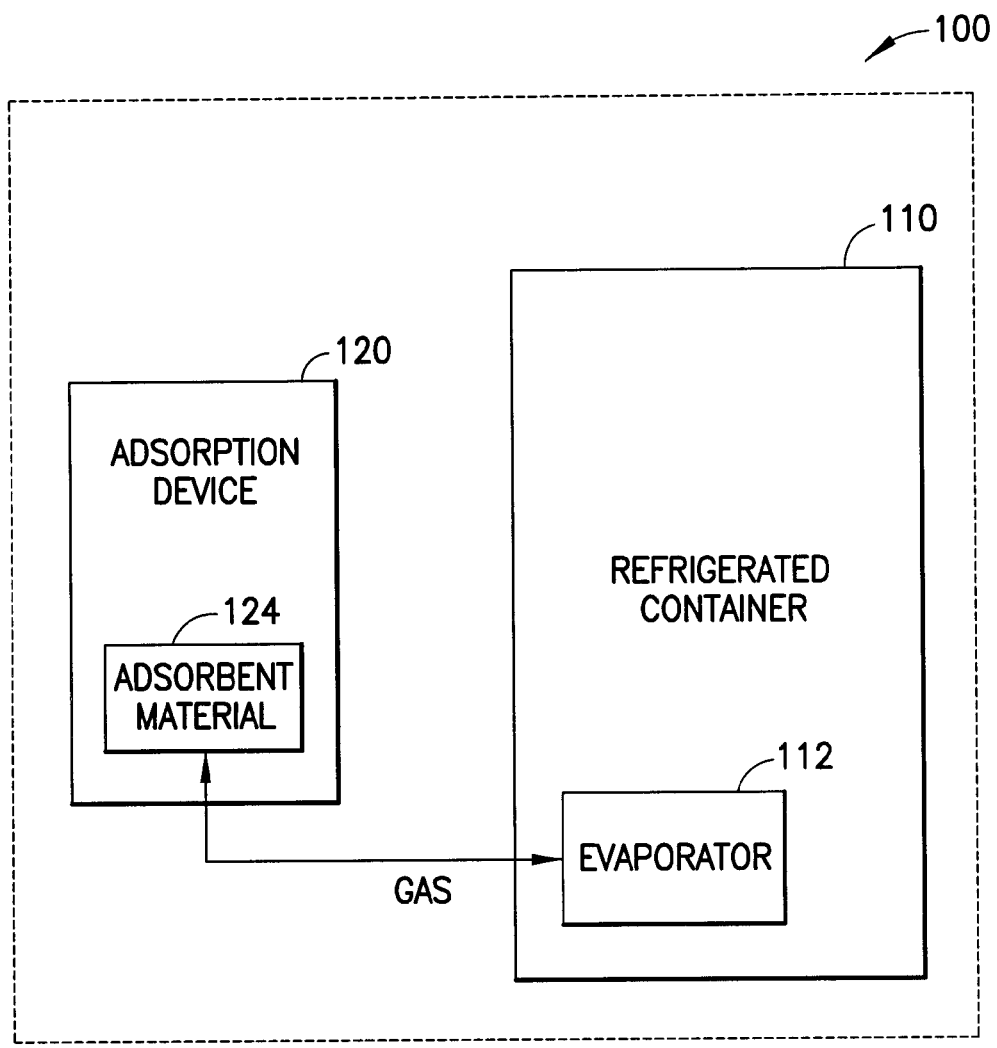
FIG. 1 is a schematic view of an adsorbent-based refrigeration system according to an exemplary embodiment.

FIG. 1 is a schematic view illustrating a portion of a refrigeration system 100. The system includes a refrigerated container 110 having an evaporator 112 associated therewith. An adsorption device or system 120 is provided that includes an adsorbent material 124 for adsorbing and desorbing a refrigerant fluid (e.g., gas) such as ammonia ($NH_3$). Other features of the system 100 (e.g., solar collectors, sorption generators, condensers, etc.) are not shown for simplicity, although those familiar with adsorption-based refrigerator systems will readily understand that such other features can be provided in an operational system to facilitate the refrigeration cycle.

FIG. 2 is a cross-sectional schematic view of a portion of the adsorption device 120 according to an exemplary embodiment. The adsorption device 120 includes a number of sheets of adsorbent material 124 according to an exemplary embodiment (e.g., three or more sheets according to one exemplary embodiment). Each of the sheets of adsorbent material 124 has a heat conductive member, for example, in the form of a sheet or plate 122 provided on one or more faces thereof (such heat conductive plates may be made of metals or other suitable materials such as metal matrix composites such as aluminum silicon carbide metal matrix composites commercially available from CPS Corporation). Heat exchange fluid is passed across (e.g., contacts) heat conductive plates 122 in a manner similar to that which occurs in a conventional heat exchanger. Adjacent heat conductive plates 122 can be separated by a space (e.g., as shown in FIG. 2) or can be provided in contact with each other such that a cutout is formed in the adjacent plates to allow heat transfer fluid to be passed between the plates.

A refrigerant fluid (e.g., a gas such as ammonia ($NH_3$) or another gas) may be routed to and from the adsorption device such that it is adsorbed/desorbed by the adsorbent material 124 during the refrigeration cycle. Spacers (not shown) may be provided to create a space or void between the heat conductive plates 122 and the adsorbent material 124 to allow the refrigerant fluid (e.g., gas) to flow between the metal plates and the adsorbent material according to another exemplary embodiment.

The orientation of the plates and adsorbent material may differ from that shown in FIG. 2 (e.g., the plates and adsorbent material may be stacked in alternating fashion such that the structure shown in FIG. 2 is rotated 90 degrees or may be provided at any other suitable orientation). It should be noted that the composition, number, size, shape, and/or configuration of the metal plates and sheets or blocks of adsorbent material may vary according to various exemplary embodiments.

According to an exemplary embodiment, the refrigerant fluid (e.g., gas) comprises ammonia ($NH_3$). According to other exemplary embodiments, the refrigerant can comprise water and/or methanol. Each of these refrigerants (ammonia, water, and methanol) has a relatively high latent heat per unit volume. In comparing the cooling capacity of ammonia and R134A refrigerants, a R134A-carbon system requires three times the carbon mass for similar performance to that of an ammonia-carbon adsorption system. Similar relationships obtained for R32 and butane refrigerants.

The adsorbent material can include activated carbon. Other adsorbent materials can be utilized (e.g., zeolites).

The adsorbent material can be or be based on an activated carbon monolith adsorbent, e.g., an adsorbent of a type useful in gas storage and delivery systems as commercially available from Advanced Technology Materials, Inc. ("ATMI") of Danbury, Conn., USA (as shown, for example, in the photographs of FIGS. 3-4 illustrating two monoliths of an adsorbent activated carbon material). Examples of activated carbon materials and/or gas storage and delivery systems are described in the following U.S. patents, the disclosures of which are incorporated by reference herein in their entirety: U.S. Pat. No. 6,743,278 to Carruthers; U.S. Pat. No. 5,518,528 to Tom et al.; U.S. Pat. No. 5,985,008 to Tom et al.; U.S. Pat. No. 5,761,910 to Tom; U.S. Pat. No. 5,916,245 to Tom; U.S. Pat. No. 6,764,755 to Tom et al.; U.S. Pat. No. 6,991,671 to Brestovansky et al.; U.S. Pat. No. 6,027,547 to Tom et al.; U.S. Pat. No. 6,019,823 to Tischler et al.; U.S. Pat. No. 5,917,140 to Tom; U.S. Pat. No. 5,993,766 to Tom et al.; U.S. Pat. No. 5,704,965 to Tom et al.; U.S. Pat. No. 5,707,424 to Tom et al.; and U.S. Pat. No. 5,704,967 to Tom et al.

Although the porosity of the activated carbon monolith adsorbent can be widely varied in specific applications, the monolith in various embodiments is a nanoporous material. In one embodiment, the nanoporous material has at least 30% of its overall porosity made up of slit-shaped pores having a size in a range from about 0.3 to about 0.72 nanometers, and at least 20% of the overall porosity made up of micropores having diameters less than 2 nanometers. In other embodiments, the nanoporous material can have a different pore composition (e.g., it may have a larger proportion of relatively large pores to provide increased permeability for the material).

Concerning thermophysical properties of several activated carbons for use in adsorption refrigeration and heat pump applications, Table 1 sets forth typical values for monolithic carbon samples are compared with the aforementioned commercially available ATMI activated carbon.

TABLE 1

| Thermophysical property | Typical Monolith | ATMI Monolith |
|---|---|---|
| bulk density, kg m$^{-3}$ | 750 | 1120 |
| thermal conductivity, Wm$^{-1}$K$^{-1}$ | 0.44 | 0.92 |
| limiting concentration (NH$_3$), kg · kg$^{-1}$ carbon | 0.36 | 0.24 |
| radial permeability, K$_r$m$^2$ | 1000-3500 × 10$^{-16}$ | 9 × 10$^{-16}$ |
| specific heat, J kg$^{-1}$ K$^{-1}$ | 1080 | 1000 |

One advantage of utilizing carbon monoliths is that such structures have a relatively high volume fraction of micropores, which provides high capacity refrigerant storage per unit volume. Other advantageous features include relatively high thermal conductivity and the ability to be manufactured to satisfy close-tolerance geometric specifications as a single piece (as opposed to granular or beaded adsorbent which tends to attrit over time).

The structure of the adsorbent material can be suitably configured to provide enhanced performance in refrigeration applications. For example, the material can be optimized to improve its mass transfer capabilities and/or its thermal conductivity without adversely affecting its other properties. It is desirable to provide an adsorbent material that strikes a balance between desired sorption characteristics and preferred heat and mass transfer properties.

Tradeoffs can be associated with optimizing the physical property profile of activated carbon materials. For example, increasing the permeability of the material (e.g., to improve mass transfer with the goal of improving the overall system performance in a rapidly cycling thermal sorption compression system) typically requires reducing the density of the material. This in turn can reduce the thermal conductivity and volumetric storage capacity of the material. The overall profile of the active carbon monolith properties can readily be designed to enhance system performance, within the skill of the art, and based on the disclosure herein.

Generally speaking, activated carbon monoliths can be formed as the pyrolysis product of a suitable activated carbon precursor (e.g., a polymeric material or other suitable material, such as polyvinylidene chloride, phenol-formaldehyde resins, polyfurfuryl alcohol, coconut shells, peanut shells, peach pits, olive stones, polyacrylonitrile, polyacrylamide, etc., as well as other materials that are pressure-moldable (e.g., at a molding pressure up to about 20,000 psi or higher)). For purposes of the present description, activated carbon precursors will be referred to as polymeric materials, although it should be understood that any suitable activated precursor can be utilized according to various other exemplary embodiments.

The materials are molded at elevated pressures to form a "green resin" body and pyrolyzed at a temperature below 1000° C. (preferably not exceeding about 900° C.—e.g., in a range of from about 500° C. to about 900° C. and more preferably in a range of from about 600° C. to about 900° C.).

The pyrolyzation process can be carried out in a non-oxidizing atmosphere to both create pores in the monolith (e.g., by releasing HCl or another gas from the monolith) and activate the carbon to provide sites for the refrigerant fluid (e.g., gas) to be adsorbed within the monolith. Other details of the process for producing adsorbent carbon monoliths and characteristics of such monoliths are described in U.S. Pat. No. 6,743,278 to Carruthers, the entire disclosure of which is incorporated herein by reference.

Activated carbon monoliths produced using the methods described in U.S. Pat. No. 6,743,278 to Carruthers have relatively uniform pore creation (e.g., the pores are provided generally uniformly throughout the monolith and have relatively uniform sizes, e.g., between approximately 0.5 and 1.0 nanometers).

The size, shape, and configuration of the adsorbent material may vary, e.g., in shape, size and configuration, according to various other exemplary embodiments. For example, the adsorbent material may be provided as a block having dimensions of between approximately 150 mm×150 mm×4 mm and 300 mm×300 mm×25 mm (e.g., 250 mm by 250 mm by 10 mm).

As shown in FIG. 2, a number of sheets of adsorbent material 124 are provided in an adsorption structure 120 according to an exemplary embodiment. Each of the sheets of adsorbent material 124 has a heat conductive plate or sheet 122 provided on either face thereof. Heat exchange fluid is passed across (e.g., contacts) heat conductive plates 122. Adjacent heat conductive plates 122 may be separated by a space (e.g., as shown in FIG. 2) or may be provided in contact with each other such that a cutout is formed in the adjacent plates to allow heat transfer fluid to be passed between the plates (note that the heat transfer fluid is isolated from the refrigerant fluid).

One issue associated with adsorption systems having an arrangement such as that shown in FIG. 2 is that mass transfer through the structure is limited by the solid metal material that forms the heat conductive plates 122. Thus, while the refrigerant fluid (e.g., gas) may relatively freely enter and exit the adsorbent material 124 through the surfaces of the material that are not provided in contact with the heat conductive plates 122 (e.g., surfaces 126, 128 on the top and bottom edges as shown in FIG. 2), the fluid (e.g., gas) is constrained by the heat conductive plates 122 where the plates 122 and adsorbent material 124 are in contact. By constraining the number of locations through which the refrigerant fluid (e.g., gas) may exit from the adsorbent material, the mass transfer rate and efficiency of the system may not be optimal for relatively quick cycling applications such as solar adsorption refrigeration systems.

According to one exemplary embodiment, plates made of a porous material (e.g., a porous metal material similar to that used in filtration applications) may be used to improve the mass transfer efficiency of the system. Refrigerant fluid (e.g., gas) being adsorbed by or desorbed from the adsorbent material may travel through the porous metal without being constrained as is the case with the embodiment shown in FIG. 2.

Figure 5:
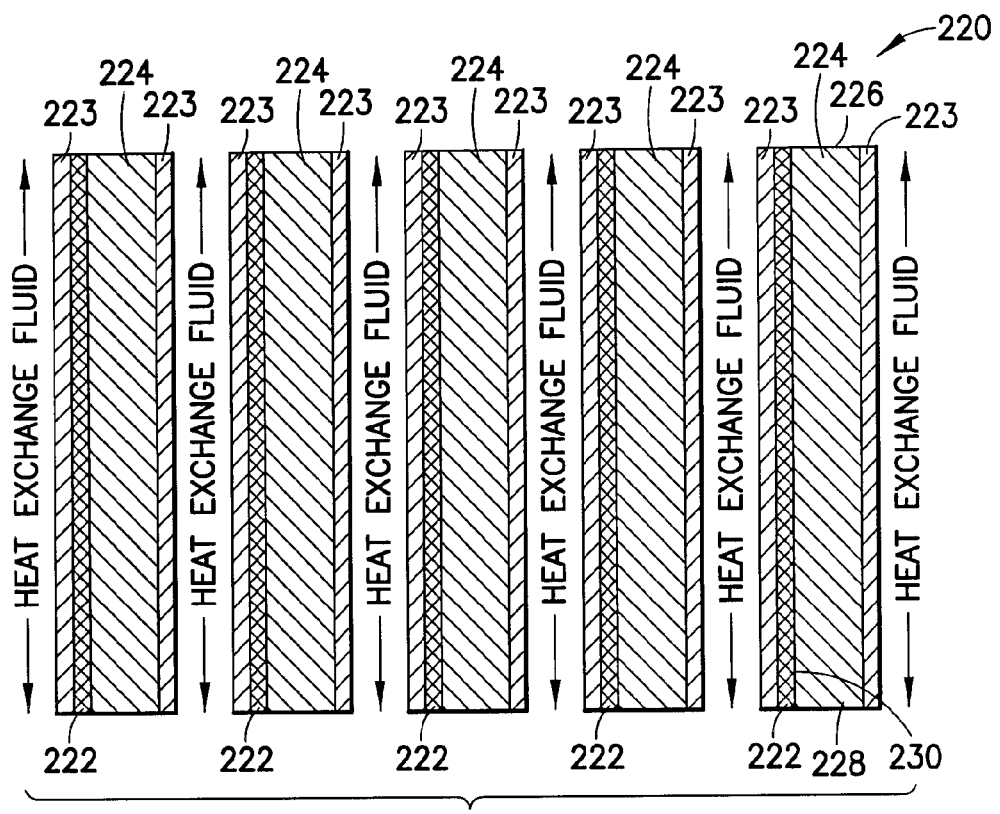
FIG. 5 is a schematic cross-sectional view of an adsorption system or device that utilizes porous metal plates according to an exemplary embodiment.

FIG. 5 is a schematic cross-sectional view of a portion of an adsorption system 220 for use in a refrigeration system. The adsorption system 220 includes a plurality of porous plates 222 (e.g., porous metal plates), each of which are provided in contact with or in close proximity to one surface of a sheet or block of adsorbent material 224 (e.g., activated carbon). The porous plates 222 and the absorbent material 224 are sandwiched between metal plates 223 (i.e., non-porous plates), to transfer heat from the system from a heat transfer fluid.

The orientation of the plates 222 and adsorbent material 224 may differ from that shown in FIG. 5 (e.g., the plates and adsorbent material may be stacked in alternating fashion one on top of the other such that the structure shown in FIG. 5 is rotated 90 degrees or may be provided at any other suitable orientation, including different shapes and sizes).

The material used to form the plates 222 is a relatively porous material that is configured to allow refrigerant fluid (e.g., gas) to pass relatively freely therethrough. In this manner, refrigerant fluid (e.g., gas) being adsorbed or desorbed from the adsorbent material 224 can enter and exit the adsorbent material 224 not only through uncovered surfaces of the adsorbent material 224 (e.g., surfaces 226, 228), but also through surfaces of the adsorbent material adjacent one or more of the plates 222 (e.g., surface 230 as shown in FIG. 5), thus improving the mass transfer efficiency of the system.

Any of a variety of porous heat conductive materials can be used to form the plates 222, including porous metals (e.g., silver, aluminum, nickel, copper), porous metal alloys, porous ceramics, and other suitable porous materials. For example, porous metals having utility in filtration applications may be used. One example of such a material is a 316L stainless steel porous metal sheet of 1/16 inch thickness commercially available from Mott Porous Metals Inc. Generally, the porous heat conductive material can be of any suitable morphological character and may include any suitable heat conductive material. For example, the porous heat conductive material can comprise a metal material, such as a sintered metal matrix material, a woven or nonwoven metal fabric, a metal screen or other foraminous metal sheet material, and aggregate or composite material comprising metal particles or other bodies of discontinuous form, as consolidated under heat and pressure to form a unitary porous article.

According to an exemplary embodiment, the plates 222 have a porosity profile that is configured to allow the refrigerant fluid (e.g., gas) to move relatively freely therethrough. For example, the plates 222 can have a porosity of between approximately 25 and 40 percent and an average pore size of between approximately 0.1 and 100 micrometers. The porosity and pore sizes for the porous metal can vary depending on the desired performance characteristics of the plates.

Figure 6:
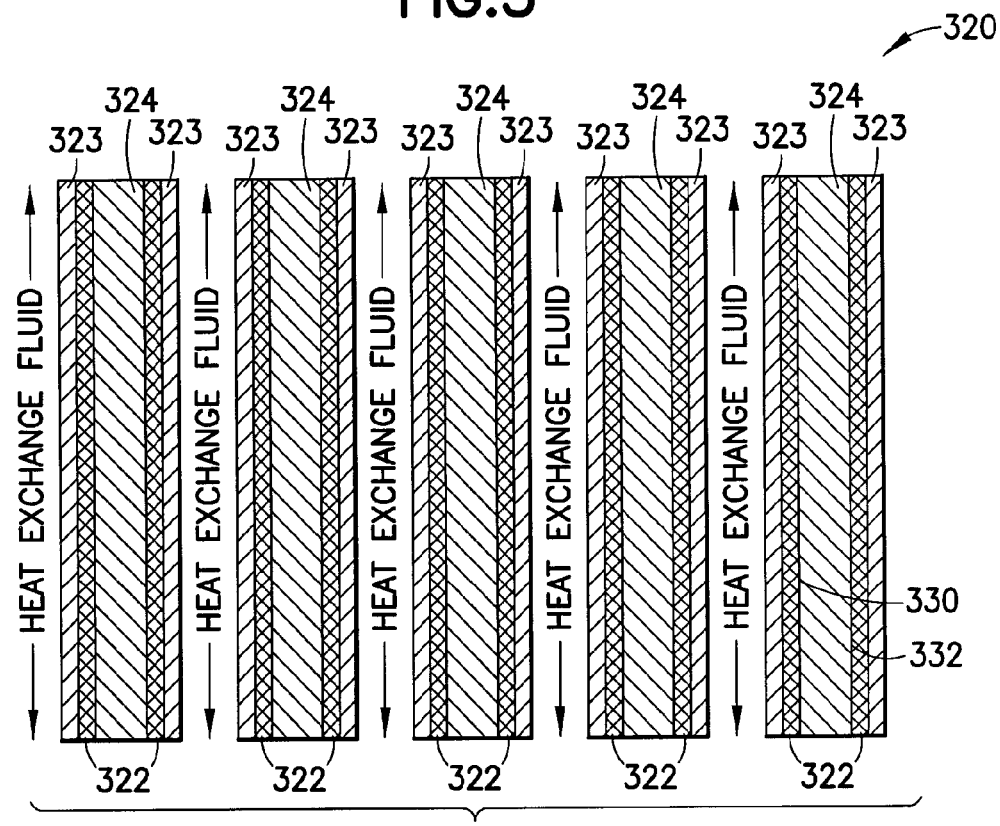
FIG. 6 is a schematic cross-sectional view of an adsorption system or device that utilizes porous metal plates according to another exemplary embodiment.

According to another exemplary embodiment shown in FIG. 6, an adsorption structure 320 includes a plurality of sheets or plates of adsorbent material 324, each having two heat conductive plates 323 associated therewith to provide for heat transfer from the adsorbent material 324. Porous plates 322 are provided in contact with both faces of sheets of absorbent material 324 used in the adsorption system 320. In this manner, refrigerant fluid (e.g., gas) can travel into and out of both surfaces of the adsorbent material 324 (e.g., surfaces 330 and 332).

While FIGS. 5-6 illustrate adsorption systems in which relatively flat plates of adsorbent material are provided in contact with generally flat porous metal plates, other configurations can also be used.

Figure 7:
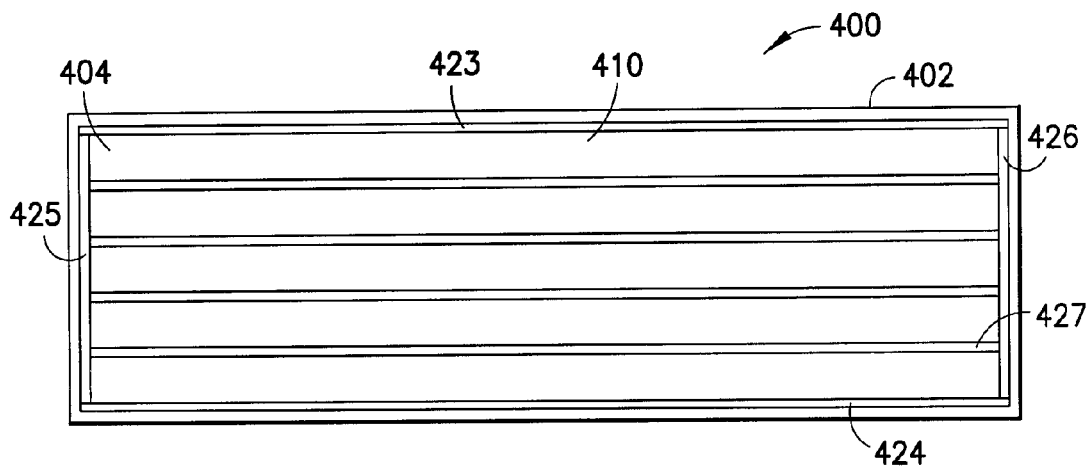
FIG. 7 is a schematic cross-sectional view of an adsorption structure that utilizes an adsorbent material and a porous metal material according to an exemplary embodiment.
Figure 8:
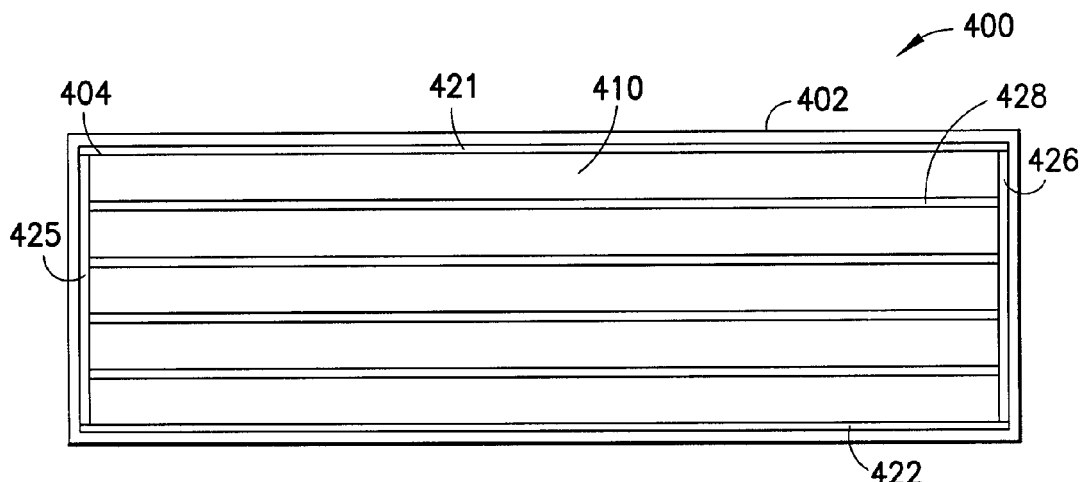
FIG. 8 is another schematic cross-sectional view of the adsorption structure illustrated in FIG. 7.
Figure 9:
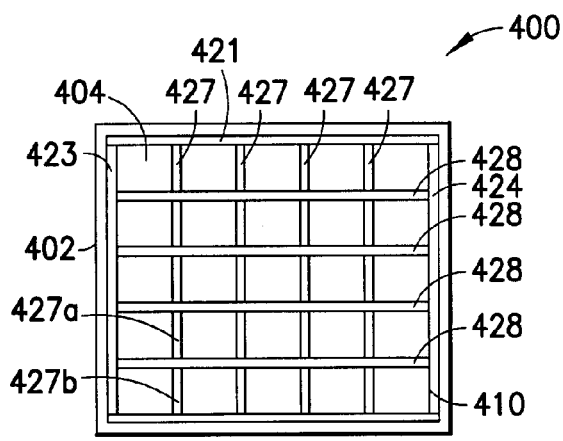
FIG. 9 is another schematic cross-sectional view of the adsorption structure illustrated in FIG. 7.

For example, FIGS. 7-9 illustrate schematic cross-sectional views of a portion of an adsorption device or system 400. The system 400 includes a housing or casing 402 that is formed from a metal (e.g., aluminum, nickel, copper, silver), metal alloy (e.g., alloys of aluminum, nickel, copper, or other suitable metals, stainless steel, etc.), a ceramic, or other suitable material. According to one exemplary embodiment, the housing 402 can include one or more apertures or openings (not shown) to allow a refrigerant fluid (e.g., gas) to travel into and out of the housing 402 such that it can be adsorbed/desorbed from an adsorption material provided therein.

Provided within the housing 402 is a structure or arrangement 404 that includes a number of members or elements formed from an adsorbent material such as activated carbon (hereinafter referred to as "adsorbent members") and a number of members or elements formed from a porous material such as a porous metal (hereinafter referred to as "porous members"). The size, shape, composition, and configuration of the adsorbent and porous members can vary according to various exemplary embodiments. According to one exemplary embodiment, all of the adsorbent materials have generally rectangular parallelpiped shapes, with each of the adsorbent members having similar or identical compositions and pore configurations. In other exemplary embodiments, adsorbent members having varying pore configurations can be used.

As shown in FIG. 9, a number of adsorbent members 410 having generally rectangular parallelpiped shapes are separated both from the housing 402 and from other adsorbent members using porous members in the form of sheets or plates. Porous metal plates 421, 422, 423, 424, 425, and 426 are provided in contact with the six sides of the housing 402, while porous members 427 and 428 define a generally orthogonal grid or matrix separating the adsorbent members 410 from each other.

As illustrated in FIG. 9, porous members 428 extend from porous member 423 to porous member 424, while the porous members 427 extend between two porous members 428 (see, e.g., porous member 427a) or between a porous member 428 and either a porous member 421 or 422 (see, e.g., porous member 427b). It will be appreciated that other configurations for the porous members can be utilized to define a grid or matrix similar to that shown in FIG. 9, within the scope of the invention.

As with the embodiments shown in FIGS. 5-6, the use of porous members (e.g., porous members (e.g., porous members 421-428) advantageously allows for relatively efficient mass transfer of refrigerant fluid (e.g., gas) within the adsorption device 400.

Figure 10:
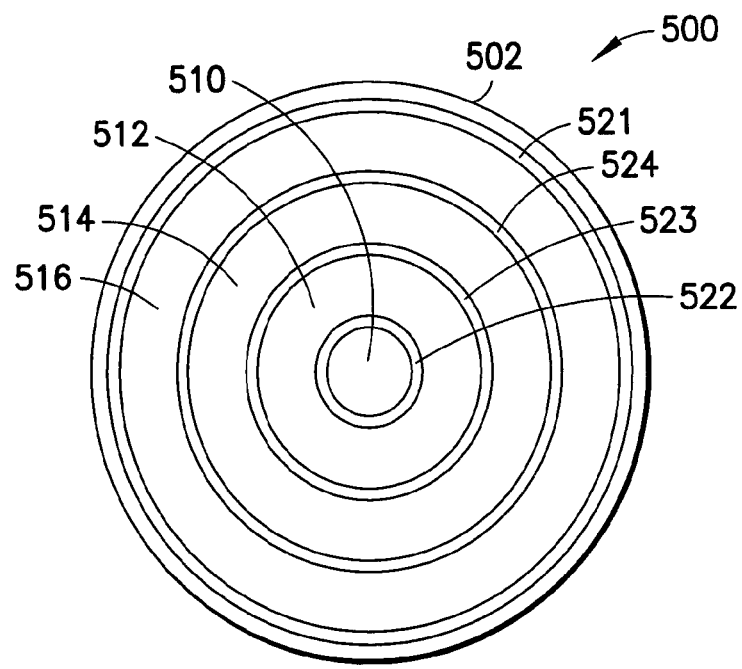
FIG. 10 is a schematic cross-sectional view of an adsorption structure that utilizes an adsorbent material and a porous metal material according to another exemplary embodiment.
Figure 11:
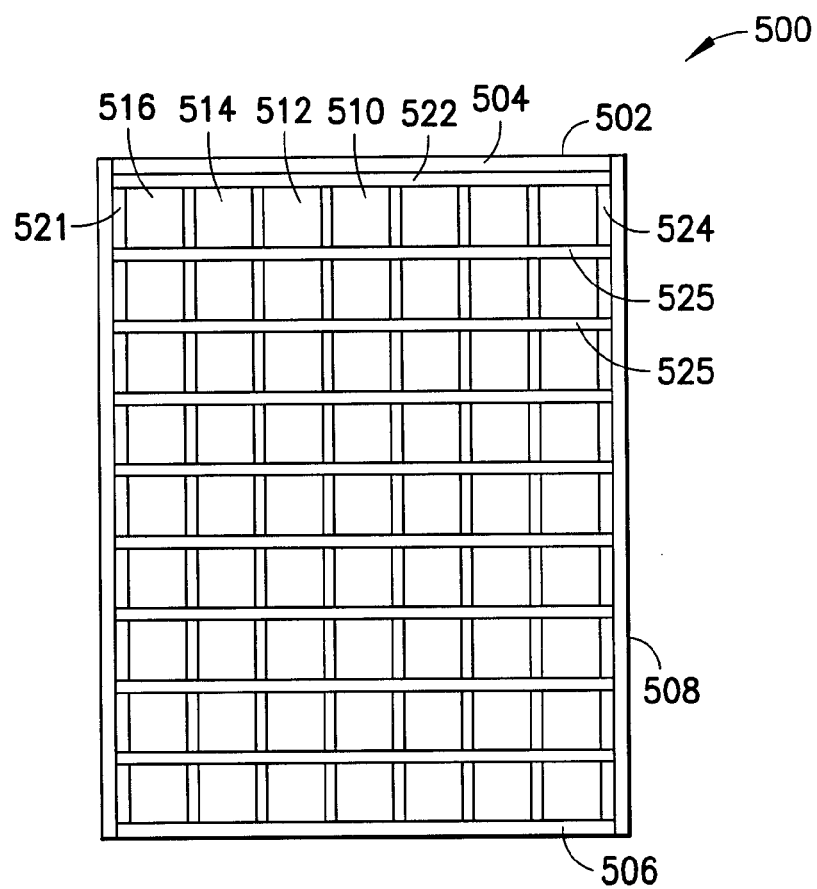
FIG. 11 is another schematic cross-sectional view of the adsorption structure illustrated in FIG. 10.

According to another embodiment shown in FIGS. 10-11, an adsorption device 500 includes a generally cylindrical housing or casing 502 having end members 504, 506 coupled or integrally formed with a generally tubular member 508. A porous metal member 521 (e.g., in the form of a generally circular disk) is provided in contact with end 504 of the housing 502 and a generally tubular porous metal member 521 is provided in contact with the generally tubular member 508 of the housing 502. Adsorbent material in the form of a generally circular disk or cylinder 510 and generally circular rings 512, 514, 516 are separated from each other with porous metal members 522, 523, and 524.

The adsorption device 500 includes a plurality of layers or levels of adsorption members and porous metal members in which the various layers or layers are separated by generally circular porous metal disks 525. According to other exemplary embodiments, the adsorbent members (e.g., members 510, 512, 514, 516) and porous metal members (e.g., members 522, 523, and 524) can extend along the entire axial dimension of the cylindrical adsorption structure (i.e., so that there are no members such as porous metal disks 525 separating adjacent layers).

Figure 12:
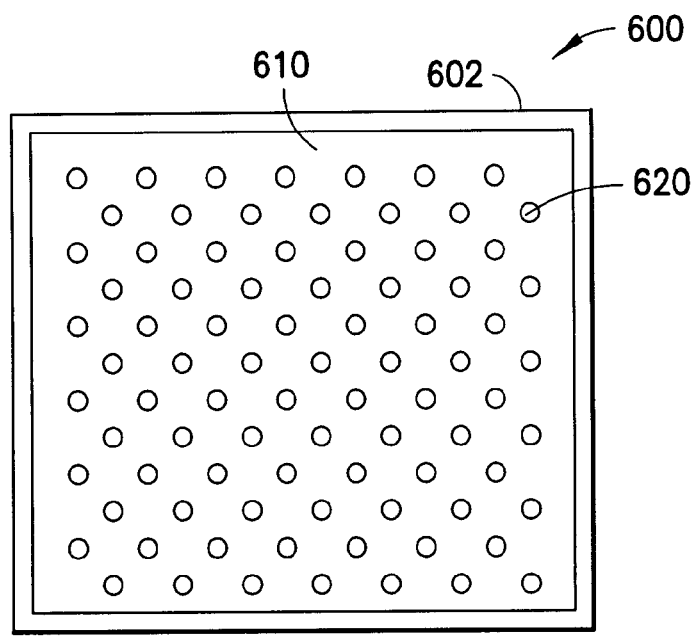
FIG. 12 is a schematic cross-sectional view of an adsorption structure that utilizes an adsorbent material and a porous metal material according to another exemplary embodiment.
Figure 13:
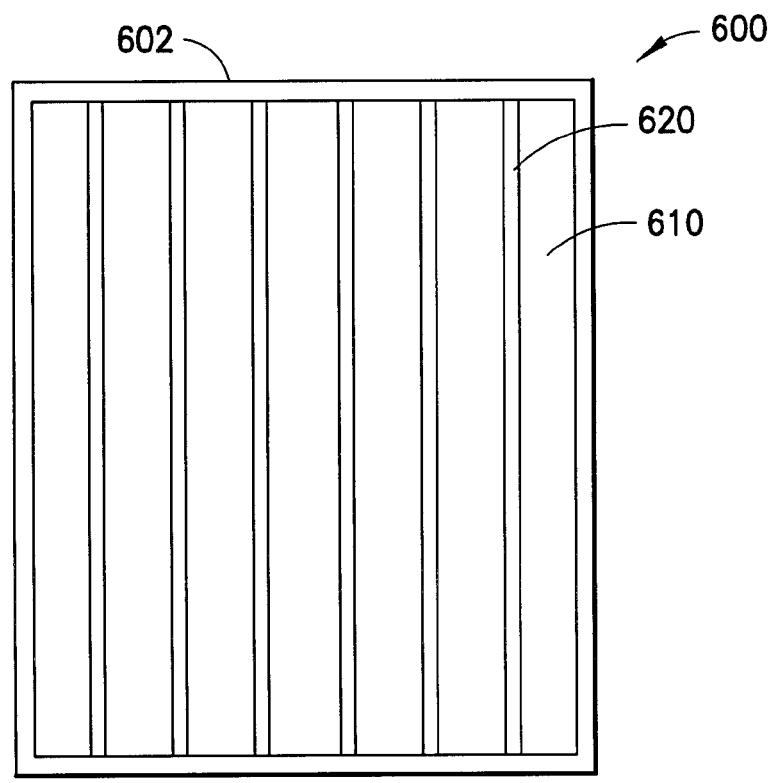
FIG. 13 is another schematic cross-sectional view of the adsorption structure illustrated in FIG. 12.

FIGS. 12-13 illustrate an adsorption device 600 in which porous members (e.g., porous metal members) are provided in a matrix of adsorption material. The adsorption device includes a housing or casing 602 having a generally rectangular parallelepiped configuration, although the size, shape, and configuration of the housing may vary according to other exemplary embodiments.

Provided within the housing is an adsorbent material 610 having porous members or elements 620 (e.g., porous metal members) included therein. As illustrated, the porous members 620 are provided in the form of elongated rods having generally circular cross-sections. According to other exemplary embodiments, the members 620 can a have square, rectangular, or other cross-sectional shapes. Optional porous metal plates (not shown) may also be provided in contact with one or more internal surfaces of the housing 602 to separate the adsorbent material 610 therefrom.

Considering the variety of other possible configurations for the adsorbent/porous metal structures, it is generally desirable to utilize configurations in which the adsorbent material takes up a relatively large volume within the adsorbent structure so that the total adsorbent capacity of the device is as large as possible. This means that the porous metal sheets/rings/cylinders should preferably be very thin in the direction in which they are separating two adjacent blocks of adsorbent material. The optimal dimensions of adsorbent material and porous metal (as well as the porosity of the metal) can be tailored for particular applications, within the skill of the art, based on the disclosure herein.

One advantageous feature of using porous metal members such as those shown in FIGS. 7-13 is that the relatively high thermal conductivity of the metal will facilitate heat transfer within the adsorption devices, while the porosity of the metal facilitates mass transfer of the adsorbate.

The porous metal material described with respect to the foregoing embodiments can be provided in pre-formed shapes or can be formed in conjunction with the formation of the adsorption structures. For example, holes can be formed in the "green" polymer prior to pyrolysis (e.g., by drilling into the material). Porous metal (e.g., a nickel sponge material) can then be provided in the holes either prior or subsequent to pyrolysis. It may also be desirable to provide non-porous metals in the holes in order to improve thermal conduction within the adsorbent material. Because both porous and non-porous metal materials exhibit higher thermal transfer capabilities than the adsorbent material, the heat transfer characteristics of the resulting adsorption material can be significantly improved.

To improve the heat transfer characteristics of the adsorbent material (e.g., the adsorbent material as described with reference to the various exemplary embodiments described above), it may be desirable to include a different material as a second phase within the adsorbent material (either prior or subsequent to pyrolysis). The second phase can be used to enable relatively rapid thermal conduction and fast transport of sorbent gases within the same material.

In one embodiment, the second-phase material is diamond-like carbon. Other materials may be used for the second phase material in other embodiments, including diamond nanocrystals or microcrystals, carbon nanotubes, or other suitable carbon-based or non-carbon-based materials. In one specific embodiment, the second phase material includes carbon fibers commercially available from Cytec Engineered Materials of Tempe, Ariz., USA under the trademark Thermalgraph®. In other embodiments, the second phase material can include nickel particles, nickel foam materials, nickel wires, metallic mesh, metallic beads or fibers, or CIP/HIP aligned fibers. Other materials can also be utilized.

The second phase material can be provided within the adsorbent material matrix using any suitable method, and may be formed in situ or ex situ. In one embodiment, the second phase material (e.g., ex-situ diamond material such as diamond-like carbon) is blended directly with the polymer used to form the adsorbent material before pressing and pyrolysis (pyrolysis conditions should be carefully controlled to avoid oxidation of the diamond material). In other embodiments, catalysts are provided within the material such that diamond-like carbon or other desired second phase material is created during the relatively high temperature pyrolysis process.

In various embodiments, the second phase materials can be ordered once they are provided within the polymeric material. For example, acoustic or magnetic means (e.g., the application of a magnetic field) may be used to align particles or fibers of the second phase material. In a specific embodiment, a polymer block can be extruded in such manner that second phase materials incorporated therein are ordered during the extrusion process. Other methods for aligning particles may also be used (e.g., spin coating high thermal conductivity fibers into the polymer mix; applying an electrostatic charge to fibers within a polymer matrix such that they will be oriented by an external field prior to pressing the polymer into a block or other shape, etc.).

In a further embodiment, thin metal plates or rods (or other desired shapes) are incorporated into the polymeric material used to form the adsorbent material prior to pyrolysis. Once pyrolysis is completed, the metal components are contained within the material to provide enhanced heat transfer for the material.

According to another embodiment, second phase materials are added to an adsorbent material prior or subsequent to pyrolysis by drilling one or more holes in the material and backfilling the hole with the second phase material (e.g., to produce metal rods through a portion of the material). In another embodiment, a metal-containing gas molecule (e.g., $WF_6$) is adsorbed into the holes and/or into pores of the material, followed by a thermal decomposition of the molecule. In yet another embodiment, a metal such as tungsten is deposited in the holes and/or into pores of the material. Another embodiment utilizes a metal-containing solution that is adsorbed to leave metal in the adsorbent material upon decomposing the impregnated compound (e.g., nickel citrate).

Figure 14:
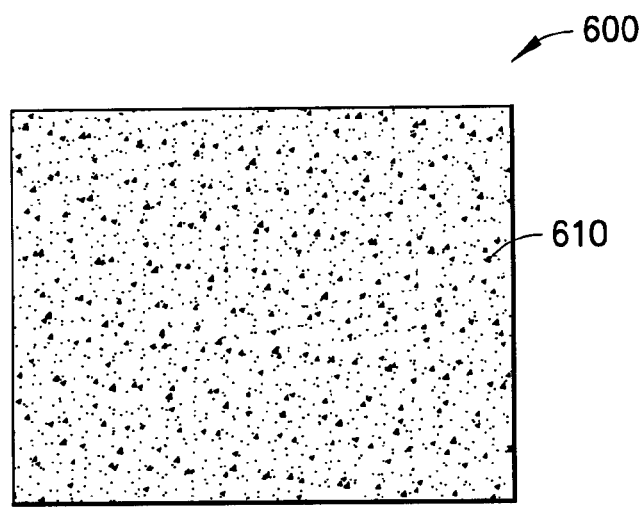
FIG. 14 is a cross-sectional schematic view of an adsorbent material having a second phase material provided therein according to an exemplary embodiment.

The second phase materials can be provided relatively uniformly throughout the adsorption material or it can be provided only in select locations in the adsorption material. As illustrated in FIG. 14, a sheet or block of adsorbent material 600 (e.g., activated carbon) has incorporated therein a second phase 610 (shown as dots within the material) uniformly distributed throughout.

Alternatively, the second phase can be provided only in select locations within the adsorbent material and/or it can be provided in a manner such that the ordering of the second phase or the concentration of the second phase material can vary at select locations. For example, the second phase material can be provided in the polymer selectively only in locations where enhanced thermal transfer is desired; once the polymer is compressed into the desired shape prior to pyrolysis, the second phase material will remain in the same locations.

By adjusting the amount and/or location of the second phase material, the heat capacity and conduction of the adsorbent material can be modified. If one reaches the percolation limit for the material, it can for example be possible to have a continuous thermal conduction path through diamond to diamond contacts.

Figure 15:
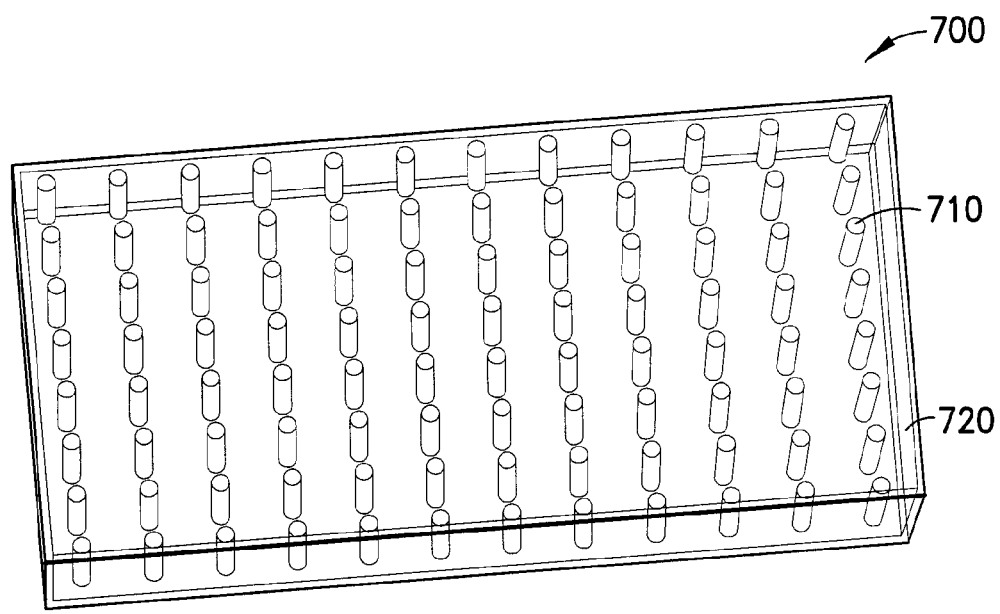
FIGS. 15-16 illustrate the use of heat conductive members provided within a matrix of adsorbent material.
Figure 16:
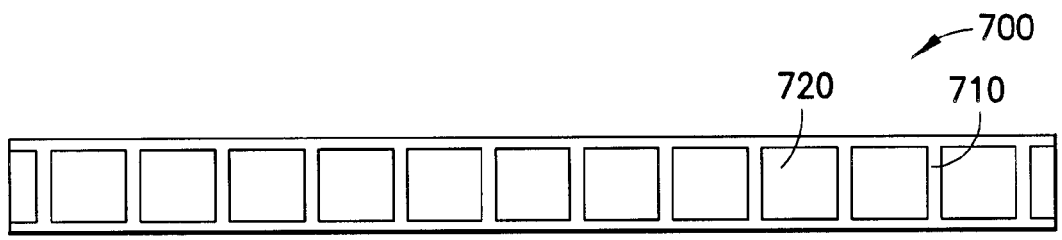

According to another exemplary embodiment shown in FIGS. 15-16, an adsorbent structure 700 may include heat conductive (e.g., metal) members 710 provided in a matrix 720 of adsorbent material. Holes can be drilled into a substrate and filled with a heat conductive material. The drilling and filling steps may be performed in a pre-pyrolysis polymeric member or on a post-pyrolysis adsorbent material, and any suitable method may be used for filling the holes. One method of filling the holes is to cast the metal into the holes.

The heat conductive material can be selected based on any number of criteria, including the desired thermal conductivity of the material and the thermal expansion difference between the adsorbent material and the conductive material. In one embodiment, silicon is used as the heat conductive material. In another embodiment, aluminum or an aluminum alloy or another metal or metal alloy may be used.

While the adsorption cooling system described herein has been discussed as having utility in refrigeration systems such as mobile refrigerators, it should be noted that such adsorption system may find utility in other systems as well. For example, an adsorption system utilizing materials variously described herein may be utilized in a system that provides passive cooling or heating for swimming pools. As another example, an adsorption system utilizing materials as variously described herein can be utilized in a system for cooling equipment (e.g., laboratory equipment, manufacturing equipment, etc.) or in a system that provides home air conditioning. It will be appreciated that the adsorption system can also be used in a wide variety of other applications in which refrigeration or cooling is desired.

It should be noted that any references to relative positions (e.g., "top" and "bottom") in this description are merely used to identify various elements as are oriented in the FIGURES. It should be recognized that the orientation of particular components may vary greatly depending on the application in which they are used.

For the purpose of this disclosure, the term "coupled" means the joining of two members directly or indirectly to one another. Such joining may be stationary in nature or moveable in nature. Such joining may be achieved with the two members or the two members and any additional intermediate member(s) can be integrally formed as a single unitary body with one another or with the two members, or the two members and any additional intermediate member(s) can be attached to one another. Such joining may be permanent in nature or may be removable or releasable in nature.

In cases where it is desirable to produce an adsorbent material having a generally uniform pore profile (e.g., where the pore sizes and the number of pores are relatively constant throughout the material), a compressed block, sheet, or other member made of a polymeric material (e.g., polyvinylidene chloride) is provided within a heating chamber or furnace to allow generally uniform heating of the of the polymeric material (e.g., using convection heating at a temperature of below approximately 1000° C.). The polymeric material is suspended such that only small portions of its exterior surfaces are touched by the rods or other structures suspending it to ensure generally uniform heating of the material by convection.

According to an exemplary embodiment, it may be desirable to utilize an adsorbent material (e.g., an activated carbon material) that has a pore profile including pores of different sizes within the material and/or including different densities of pores within the material. According to one embodiment, relatively small pores having diameters of between approximately 0.5 and 1.0 nanometers may be formed in one or more regions of the adsorbent material while relatively large pores having diameters of between approximately 1.5 and 4.0 nanometers or larger may be formed in one or more other regions of the material.

While adsorbent materials having a large volume of relatively small storage pores may be desirable for storing a large volume of refrigerant fluid or gas, the absence of larger "feeder" pores may limit the ability to quickly cycle gas into and out of the adsorbent material, which may be important in certain refrigeration system application. By forming larger feeder pores (e.g., pores having diameters of between approximately 1.5 and 4.0 nanometers or larger) within the adsorbent material that are suited for allowing refrigerant gas to quickly enter and exit the activated carbon material in addition to relatively small pores (e.g., pores having diameters of between approximately 0.5 and 1.0 nanometers) that are better suited for storing the adsorbed refrigerant gas once it is provided within the adsorbent material, the mass transfer rate (i.e., the rate of diffusion of molecules into and out of an adsorbent material) for the adsorbent material may be improved. By controlling the location of the small and large pores within the material, it may be possible to provide a material optimized for effective mass transfer while still retaining a relatively large capacity for the adsorbed refrigerant gas.

Figure 17:
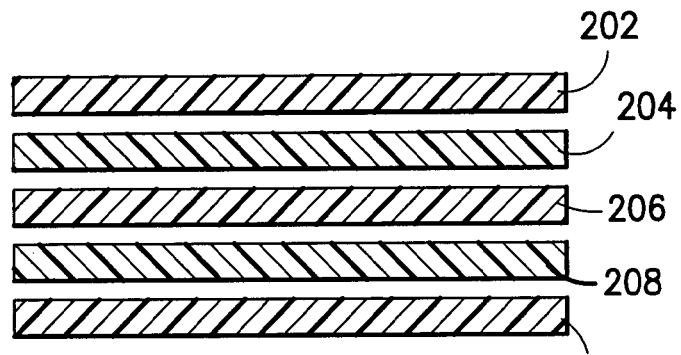
FIG. 17 is a schematic cross-sectional view illustrating several layers of polymeric material having different densities provided proximate each other according to an exemplary embodiment.
Figure 18:
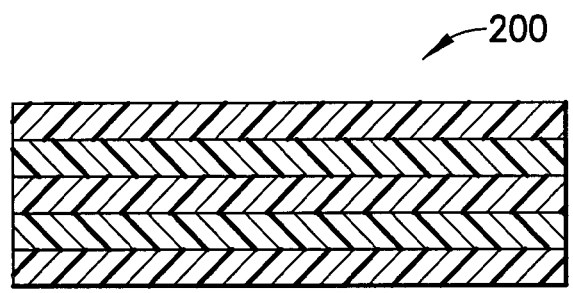
FIG. 18 is a schematic cross-sectional view illustrating the layers shown in FIG. 17 provided in contact with each other prior to pyrolysis.
Figure 19:
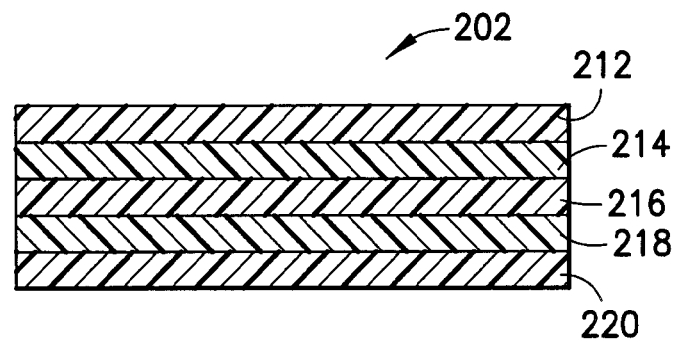
FIG. 19 is a schematic cross-sectional view illustrating the layers shown in FIG. 17 subsequent to pyrolysis.

FIGS. 17-19 illustrate one method for producing an adsorbent material having differing porosity within different regions of such material. A plurality of different layers of polymeric material 202, 204, 206, 208, and 210 are provided. According to an exemplary embodiment, the layers 202, 204, 206, 208, and 210 are provided in the "green" (e.g., pre-pyrolysis) state and are formed of a compacted material such as polyvinylidene chloride (PVDC).

As illustrated in FIG. 17, layers 202, 206, and 210 have a density that is greater than the density of layers 204 and 208. For example, layers 202, 206, and 210 can be compressed at a greater pressure to densify such layers to a greater extent than layers 204 and 208. According to an exemplary embodiment, the density of PVDC layers 202, 206, and 210 can be between approximately 1.58 and 1.68 grams per milliliter, while the density of layers 204 and 208 can be between approximately 1.70 and 1.78 grams per milliliter.

As shown in FIG. 18, the layers 202, 204, 206, 208, and 210 are provided in contact with each other to form an adsorbent member 200 (e.g., a sheet, plate, block, or other suitable structure). According to an exemplary embodiment, the layers are laminated together. According to other exemplary embodiments, other methods may be used to form the member 200.

When the member 200 is subjected to a pyrolysis process at elevated temperatures, it is expected that the characteristics of the pores formed during pyrolysis will differ depending on the density of the material. As shown in FIG. 19, the layers provided as having a higher density (e.g., 202, 206, and 210) will form layers in the pyrolyzed structure 202 that have a greater number of smaller pores (e.g., layers 212, 216, and 220), while layers provided as having a lower density (e.g., 204 and 208) will form layers in the pyrolyzed structure 202 that have a lesser number of larger pores (e.g., layers 214 and 218). Thus, by providing layers of polymeric material prior to pyrolysis that have different densities, the overall pore structure of the pyrolyzed member 202 can be controlled in a desired manner.

Figure 20:
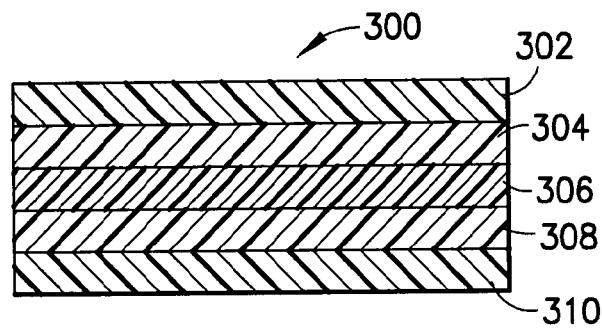
FIG. 20 is a schematic cross-sectional view illustrating an adsorbent structure according to another exemplary embodiment having regions of varying density.

Various other configurations are possible according to other exemplary embodiments. For example, FIG. 20 illustrates an embodiment in which a structure 300 is formed using layers having more than two different densities (e.g., layers 302 and 310 have high density, layers 304 and 308 have medium density, and layer 306 has low density).

Figure 21:
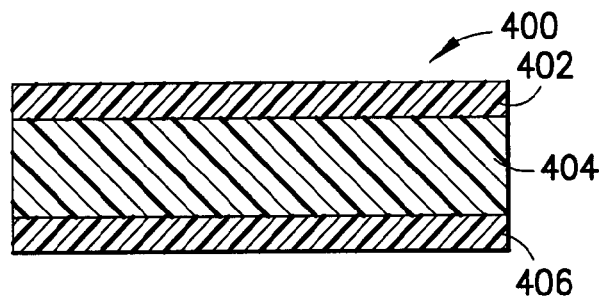
FIG. 21 is a schematic cross-sectional view illustrating an adsorbent structure according to another exemplary embodiment having regions of varying density.

The number, size, position, and configuration of the layers may also vary according to other exemplary embodiments. For example, more than five or less than five layers may be utilized according to other exemplary embodiments. As shown in FIG. 21, three layers 402, 404, and 406 are provided in which the outer layers 402 and 406 have a lower density than the middle layer 404. The middle layer 404 also has a thickness that is greater than that of the outer layers 402 and 406.

Figure 22:
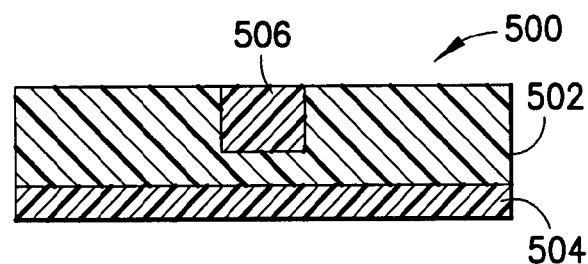
FIG. 22 is a schematic cross-sectional view illustrating an adsorbent structure according to another exemplary embodiment having regions of varying density.

The position of the members having different densities may also be selected in other manners. That is, instead of simply laminating sheets having different densities together, regions of greater or lesser density may be provided within individual layers. As shown in FIG. 22, an adsorbent structure is shown in which two layers 502 and 504 having different densities are provided. A region 506 of lower density is provided within the layer 502 (e.g., a cutout or channel may be formed within the layer 502 and the lower density material provided therein to form the region 506 using any suitable means).

While the various regions described with respect to FIGS. 17-22 have been described as having the same composition (i.e., they are formed using the same polymeric precursor material) and differing only in the density thereof, it may also be desirable to provide layers having different compositions and/or other characteristics. For example, according to another exemplary embodiment, one or more regions (e.g., layers, etc.) provided within the adsorbent structure may have a composition that differs from other regions (e.g., one type of polymeric precursor may pyrolyze to form pores having different sizes, shapes, configurations, etc. than other polymers). The layers or regions having different compositions can be used in lieu of or in addition to layers or regions having different densities.

The various regions or layers can each undergo different pre-pyrolysis treatments to alter the pore formation that can occur during pyrolysis in such regions (e.g., precursors and/or second phase materials can be provided within the different regions or layers to alter various characteristics of the regions or layers). For example, other types of carbons, zeolites, or other higher-diffusivity materials can be blended with the polymeric material prior to pyrolysis to improve the overall diffusivity of the material.

According to another exemplary embodiment, the diffusivity of the adsorbent material can be modified by thermally quenching the adsorbent material after pyrolysis (e.g., by rapid chilling at a temperature of between approximately −196° C. and 5° C.). In so doing, it may be possible to align the carbon pore structure to improve refrigerant fluid (e.g., gas) diffusivity by quickly cooling the adsorbent post-pyrolysis.

While various methods of improving diffusivity of the adsorbent material described herein may have a negative impact on the thermal conductivity of the system, such effect can be mitigated to some extent by incorporating high thermal conductivity materials into the adsorbent material (e.g., high-conductance fillers, plates, rods, etc. made of materials such as metals, diamond-like carbon, or other suitable materials).

A wide variety of embodiments is possible by providing adsorbent structures prior to pyrolysis that include one or more regions or layers having different densities, compositions, pre-treatments, and the like.

Other methods can also be used to induce varied pore formation within an adsorbent material such as activated carbon. For example, polymeric material in the green state can be provided as having various features or configurations that allow the formation of relatively large pores in the pyrolysis operation.

Figure 23:
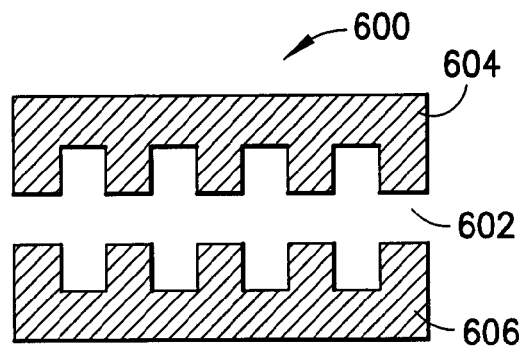
FIG. 23 is a schematic view of a portion of a mold for the formation of green polymeric material to be pyrolyzed to form an adsorbent material according to an exemplary embodiment.
Figure 24:
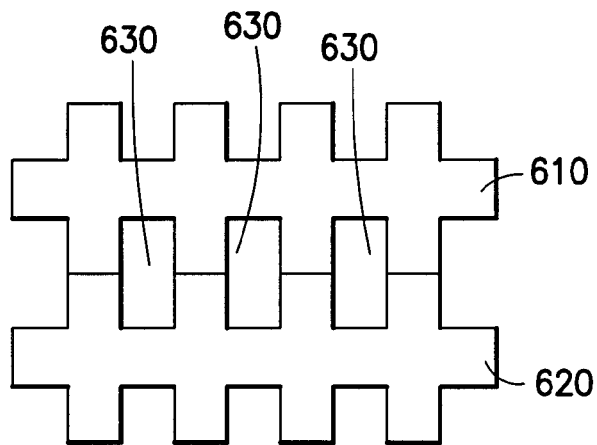
FIG. 24 is a schematic view of a green polymeric material member formed using the mold shown in FIG. 23 provided in contact with a similar green polymeric material member.

As shown in FIGS. 23-24, a device 600 such as a mold or other structure can be used to form green polymeric materials that include features that, when aligned with other similar polymeric members, result in void or pore formation during pyrolysis. As shown in FIG. 23, the device 600 includes a cavity 602 defined by two portions 604, 606.

As shown in FIG. 24, after molding the green polymeric material, a number of polymeric materials can be provided in contact with each other (e.g., by laminating the polymeric members together as shown in FIG. 24 for polymeric members 610 and 620.

The configuration of the polymeric members 610 and 620 is such that one or more spaces 630 are formed between the members (the portions of the polymeric members 610 and 620 are shown enlarged to illustrate the concept; the spaces between the members may have sizes between approximately 1 and 100 microns, and according to various exemplary embodiments, the particular size, shape, configuration, and other features of the spaces may vary).

Figure 25:
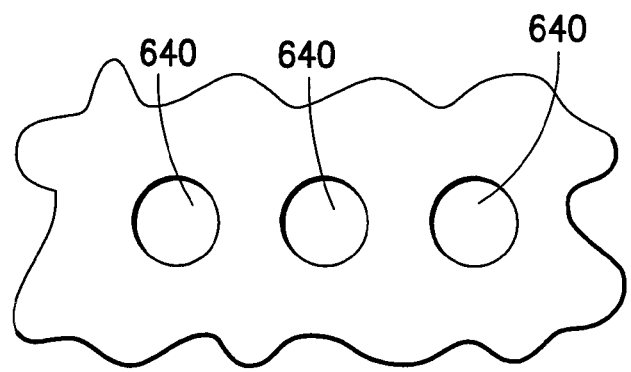
FIG. 25 is a schematic view an adsorbent material formed using the polymeric members shown in FIG. 24.

During pyrolysis, adjacent polymeric members will fuse together and form pores within the bulk material. While relatively small pores may be formed within the polymeric material during pyrolysis, the spaces between the adjacent materials (e.g., spaces 630 shown in FIG. 24) may serve to form relatively large pores within the pyrolyzed material (illustrated, for example, as pores 640 shown in FIG. 25).

The green polymeric members having features intended to induce pore formation may be produced using methods other than molding. For example, according to an exemplary embodiment, relatively flat or untextured polymeric members (e.g., sheets) may be formed, after which the members may be modified so that they include features intended to induce pore formation during pyrolysis.

Figure 26:
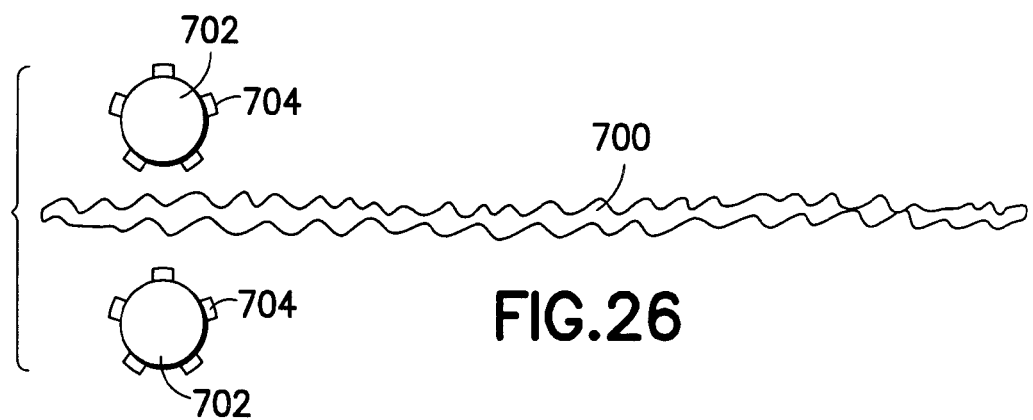
FIG. 26 is a schematic view of a process for modifying the structure of a green polymeric member according to an exemplary embodiment.

FIG. 26 illustrates a sheet 700 of a green polymeric material undergoing an operation to form features in the sheet that are intended to induce pore formation during pyrolysis. As shown in FIG. 26, members in the form of rollers 702 having features 704 provided thereon are used to modify the structure of the sheet 700 (e.g., to have a "wavy" or "rippled" configuration). It should be noted that according to other exemplary embodiments, the modification performed on the polymeric material may differ (e.g., the material may have cutouts formed therein, etc.).

Figure 27:
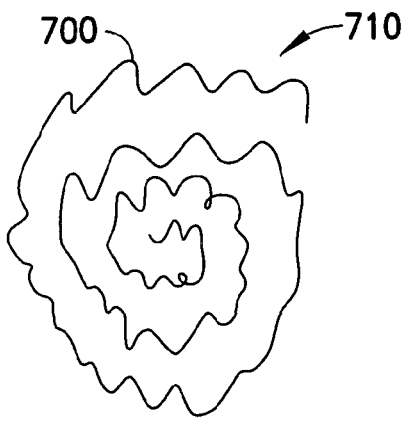
FIGS. 27-30 illustrate the formation of an adsorbent material using the green polymeric member shown in FIG. 26 according to two exemplary embodiments.
Figure 28:
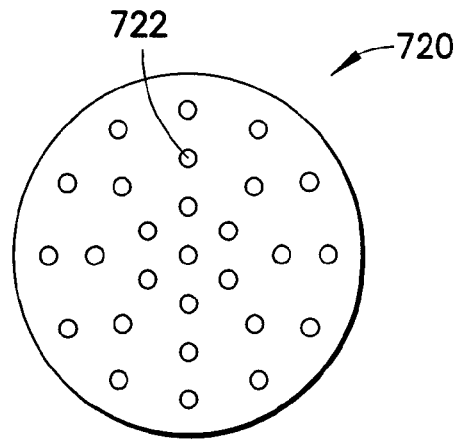

After modifying the structure of the polymeric material, the modified structure can then be used to form a member or element (e.g., a green polymeric body or structure) that will subsequently undergo pyrolysis. As shown in FIG. 27, the sheet 700 may be wound or wrapped to form a structure 710 that may subsequently be pressed or compressed to form a green body that will undergo pyrolysis. The structure of the modified sheet 700 will produce voids or spaces within in the structure 710 when the green polymeric material is compressed into a member having the desired shape. As shown in FIG. 28, subsequent pyrolysis will produce relatively large pores 722 within the adsorbent material 720 (which will also include smaller pores as a result of the pyrolysis operation).

Figure 29:
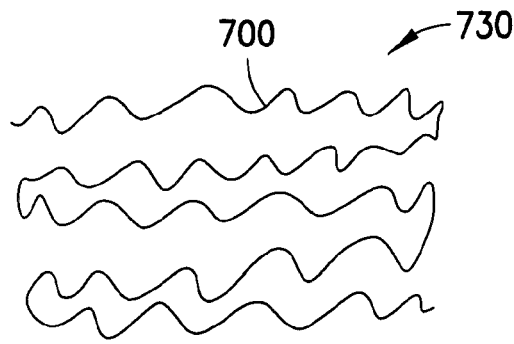
Figure 30:
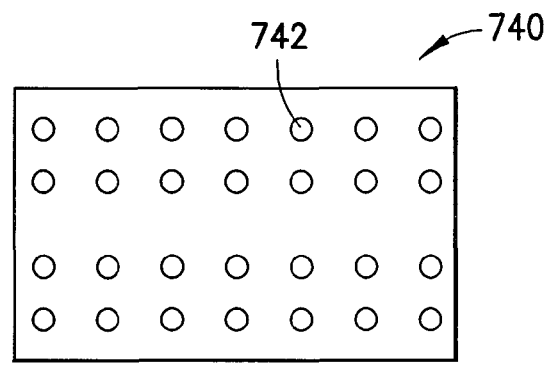

According to other exemplary embodiments (e.g., as shown in FIG. 29), the modified sheet 700 can be folded or stacked with other similar sheets to form a structure 730 that can subsequently be pressed or compressed to form a green body that will undergo pyrolysis. As shown in FIG. 30, subsequent pyrolysis will produce relatively large pores 742 within the adsorbent material 740 (which will also include smaller pores as a result of the pyrolysis operation).

According to another exemplary embodiment, preformed green polymeric materials having defined shapes can be pressed together to form green bodies that will subsequently undergo pyrolysis. The shapes of the preformed materials will result in spaces or interstices formed between them when they are compressed, which upon pyrolysis of the green bodies will produce pores within the final adsorbent material.

Figure 31:
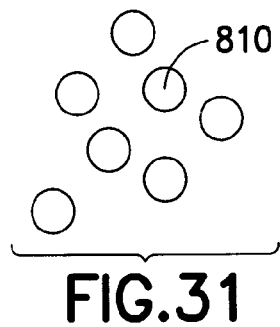
FIG. 31-36 illustrate the use of preformed polymeric elements that may be used to form adsorbent materials having pores provided therein according to an exemplary embodiment.

By way of example, a number of polymeric members 810 having generally circular or oval shapes are shown in FIG. 31. When the members 810 are subsequently compressed to form a green body that will subsequently undergo pyrolysis, spaces or voids will be formed between adjacent members 810 by virtue of their rounded shapes. During pyrolysis, small pores will be formed within the polymeric material and the spaces between the members 810 will result in the formation of larger pores 812 in the adsorbent material 814, as shown in FIG. 32.

Figure 32:
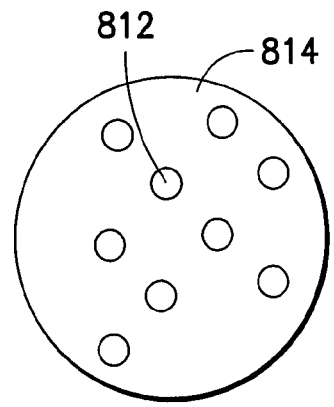
Figure 33:
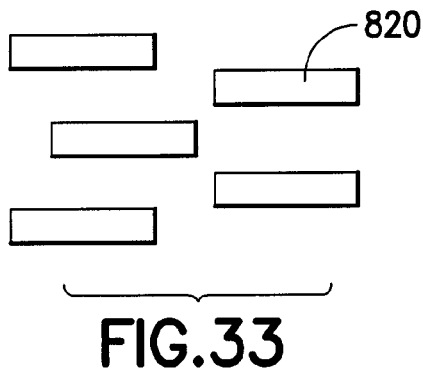
Figure 34:
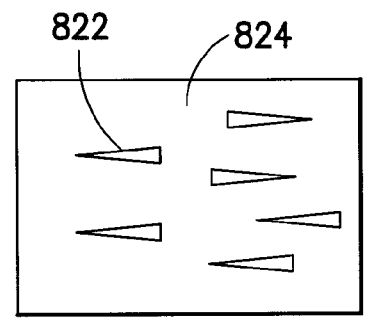
Figure 35:
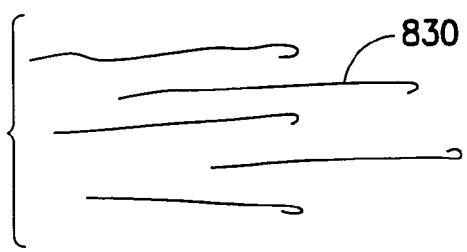
Figure 36:
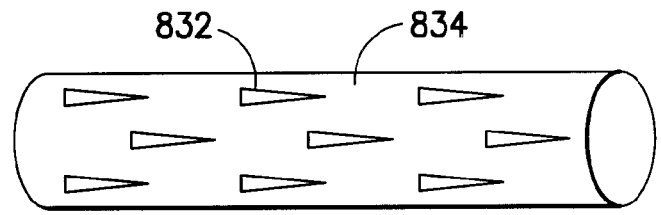
Figure 37:
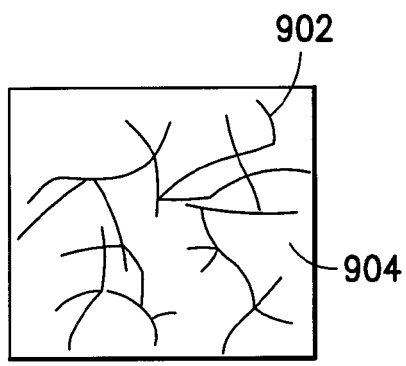
FIG. 37-45 illustrate the use of sacrificial materials within a polymeric member that will undergo pyrolysis in order to form pores within an adsorbent material according to an exemplary embodiment.
Figure 38:
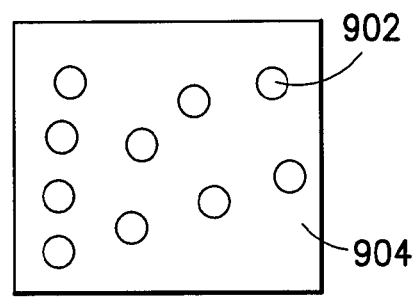
Figure 39:
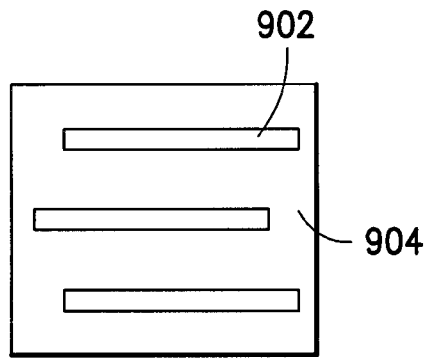
Figure 40:
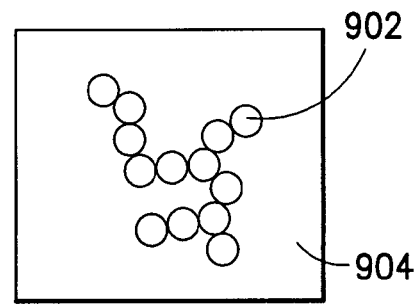
Figure 41:
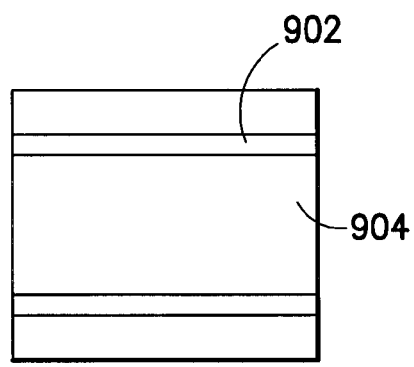
Figure 42:
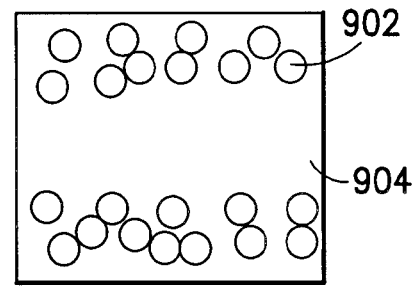

While FIGS. 31-32 illustrate the use of generally circular or oval polymeric members, other shapes may be used according to other exemplary embodiments. For example, FIGS. 33-34 illustrate the use of generally rectangular members 820 to form elongated pores 822 in an adsorbent material 824 and FIGS. 35-36 illustrate the use of elongated members 830 to form elongated pores 832 in an adsorbent material 834. The preformed polymeric members can have other sizes, shapes, or configurations according to other exemplary embodiments.

According to another exemplary embodiment, sacrificial or removable materials (e.g., filler materials that can be removed to form voids, channels, or the like in the material either before, during, or after pyrolysis is performed) can be included within a polymeric material in order to facilitate the formation of relatively large pores within an adsorbent material.

FIGS. 37-42 illustrate sacrificial materials having various configurations provided within polymeric matrices (for simplicity, all of the sacrificial materials are labeled with reference numeral 902 and all of the polymeric matrices are labeled with reference numeral 904 regardless of configuration or composition).

Figure 43:
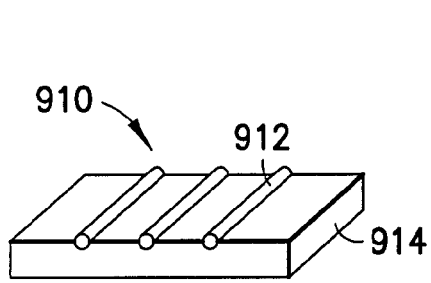
Figure 44:
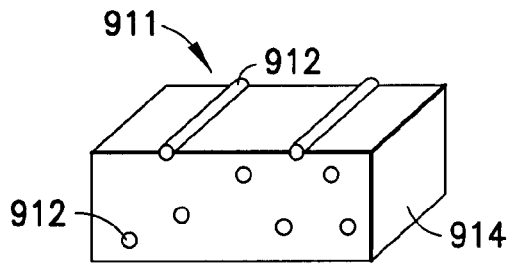
Figure 45:
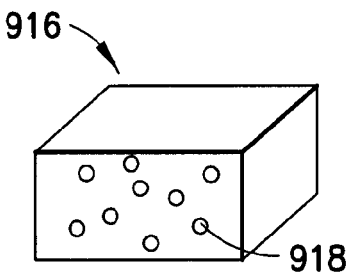

FIGS. 43-45 illustrate the use of a structure 910 that includes sacrificial materials 912 provided in the form of rods or tubes that are provided on a surface of a polymeric member 914. As shown in FIG. 44, when multiple structures similar to structure 910 are compressed together to form a green body 911 of polymeric material, the sacrificial material 912 is provided within a polymeric matrix. Upon subsequent pyrolysis as shown in FIG. 45, channels or voids 918 will be formed within the adsorbent material 916. The method shown in FIGS. 43-45 may be utilized in conjunction with sacrificial materials and polymeric members having a wide variety of sizes, shapes, and configurations, and the embodiment shown in FIGS. 43-45 is not intended to limit the concept in relation to other such configurations.

Subsequent to or concurrently with the pyrolysis process, the sacrificial materials can be removed from the adsorbent material using any suitable means (e.g., ashing, dissolving the sacrificial materials using a chemical, converting the material to a different material that is more readily removable from the adsorbent material, or by other methods) to form pores or voids within the adsorbent material. The manner in which the sacrificial materials are removed may depend on various factors, including the type of sacrificial material used.

According to one exemplary embodiment, the sacrificial materials described with respect to FIGS. 37-45 may be formed of a material such as aluminum (e.g., aluminum whiskers or other types of particles). Hydrogen chloride gas may then either exist in the gas phase (e.g., for PVDC pyrolysis) or be introduced into the structure to react with the aluminum to form $AlCl_3$, which is a gas at elevated temperatures experienced during pyrolysis or in a subsequent heating operation. The $AlCl_3$ gas is able to escape from the pores formed in the adsorbent material, leaving pores, channels, or other structures behind in the adsorbent material. According to other exemplary embodiments, the sacrificial material may be formed from other materials such as ionic salts that could be dissolved using water or another solvent. According to still other exemplary embodiments, the sacrificial material can be formed from a carbonate that can be decomposed and removed from the adsorbent material.

It should be noted that the removal of the sacrificial materials may occur before, during, or after pyrolysis using suitable means, and that the size, shape, configuration, and composition of the sacrificial materials may vary according to other exemplary embodiments.

Other methods can also be used for forming pores of relatively large size in the adsorbent material. For example, ground-up pyrolyzed carbon or beaded carbon may be added to the polymeric material prior to pyrolysis. The carbon may be added using any suitable method. According to an exemplary embodiment, it may be desirable to control the distribution of the added carbon, in which case the die may be spun prior to pressing, in order to distribute the bead concentration such that the concentration of beads and voids are highest at the outer surfaces of the polymer material.

Any suitable carbon bead material may be used. According to one exemplary embodiment, beads of relatively large size (e.g., Kureha BAC G70R, having sizes of between approximately 350 and 450 microns) and/or beads of relatively small size (e.g., Takachiho ABF14-03, having sizes of between approximately 120 and 150 microns) may be added to the polymer. These materials will retain their microporosity, but will also serve to add void space between them and the carbon structure that results from polymer pyrolysis.

According to yet another exemplary embodiment, holes with controlled diameter and depth may be generated in the activated carbon precursor (e.g. polymeric material) prior to pyrolysis using electrical discharges or laser ablation. Laser ablation uses very short pulses of a high intensity laser from sources such as excimer, Nd:YAG or $CO_2$, and causes material sublimation and removal without significant heat transfer to the rest of the material. This process can be used either before or after the pyrolysis step to create a designed structure of holes and channels for enhanced gas transport.

Branched channel structures can be created through electrical discharge prior to pyrolysis. High voltage applied to the polymer exceeding the dielectric breakdown strength will cause some of the material to undergo physical and chemical changes in the discharge path. The discharge creates a dendritic pattern of partially carbonized and degraded polymer analogous to fractures. After the pyrolysis process has been completed, these structures provide a path for faster transport of gases in the monolith.

According to another exemplary embodiment, pores formed during pyrolysis may be modified by impregnating the carbon with an oxidizer (e.g., hydrogen peroxide) which under moderate heat treatment will oxidize the more reactive amorphous carbon and clear passage ways for higher gas transfer rates. Other methods include using a time-dependent distribution of oxygen diffusing into the adsorbent body at elevated temperatures to control pore oxidation at the edges of the adsorbent body rather than in the interior thereof. According to yet another exemplary embodiment, a polar gas may be adsorbed into the carbon and then heated (e.g., using microwave heat) to "blow" holes and open up the pore structure of the adsorbent material.

Figure 46:
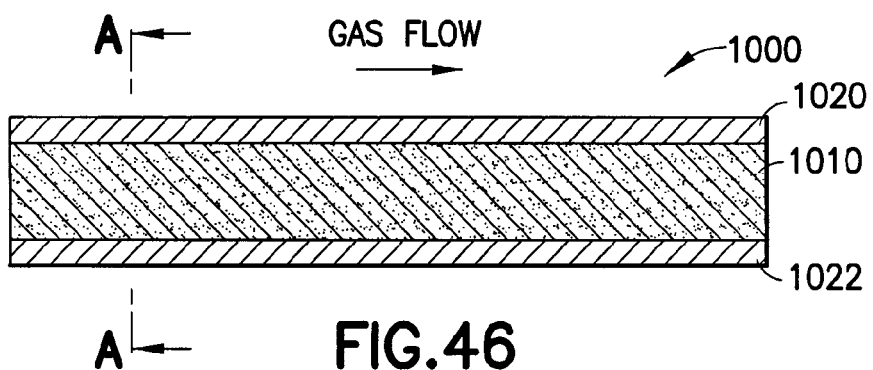
FIG. 46 is a schematic cross-sectional view of a portion of an adsorbent structure according to an exemplary embodiment.
Figure 47:
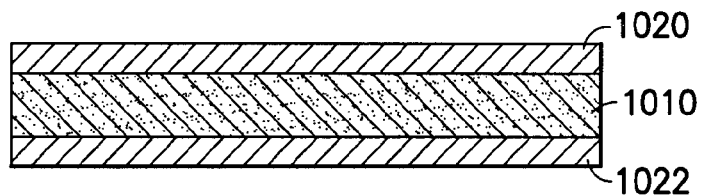
FIG. 47 is a schematic cross-sectional view of the adsorbent structure shown in FIG. 46 taken across line A-A.

In place of, or in addition to, the methods described above, the structure of the adsorbent material can be modified to improve the mass transfer in a predetermined direction as shown in FIGS. 46-47. In FIG. 46, an adsorbent structure 1000 includes an adsorbent material 1010 such as activated carbon having two metal plates 1020, 1022 provided adjacent or in contact with surfaces of the adsorbent material. In order to facilitate mass transfer in the direction of gas flow (as indicated by the arrow in FIG. 46), the adsorbent material 1010 is formed with channels that extend through the material in the direction of fluid (e.g., gas) flow, as shown in FIG. 47 (a cross-sectional view of the adsorbent material 1010 taken across line A-A in FIG. 46). The channels can have a relatively small diameter (e.g., between approximately 1 and 100 microns) and can have any suitable cross-sectional shape (e.g., circular, oval, triangular, diamond, square, rectangular, etc.). According to one exemplary embodiment, the channels are provided in a manner such that the adsorbent material has a "honeycomb" configuration when viewed in the direction of fluid (e.g., gas) flow.

According to an exemplary embodiment, the structure of the channels may be defined by using a structure formed of a sacrificial material such as aluminum or an aluminum alloy (e.g., as an aluminum honeycomb structure). The green polymer can be introduced at select locations within the structure (e.g., by flowing a liquid polymer into select locations of the structure and solidifying it). During or subsequent to pyrolysis, hydrogen chloride gas (HCl) may be present or may be introduced to react with the aluminum to form $AlCl_3$ gas, which then can be removed from the adsorbent material to leave behind channels formed within a matrix of adsorbent material. Other methods can be used to form channels within the matrix (e.g., by introducing tubes or rods of a material such as a salt that can be subsequently dissolved by water or another solvent).

In order to facilitate adsorption and desorption of gases from the adsorbent material, it may be desirable to form channels or cutouts in one or more exterior surfaces of the adsorbent material. One method by which such a method can be accomplished involves the use of etching techniques (e.g., photolithographic etching techniques).

Figure 48:
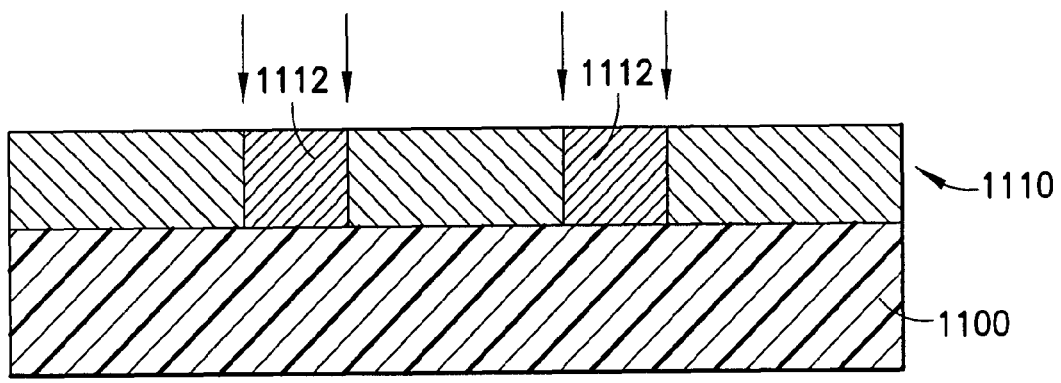
FIGS. 48-51 illustrate a method of forming features in a surface of an adsorbent material using an etching process according to an exemplary embodiment.

As shown in FIG. 48, a substrate 1100 (either a polymer precursor or a post-pyrolysis adsorbent material) has a layer of photoresist material 1110 provided on a surface thereof. While the following example is described with reference to the use of a positive photoresist, it should be understood that negative type photoresists can also be used according to other exemplary embodiments.

Figure 49:
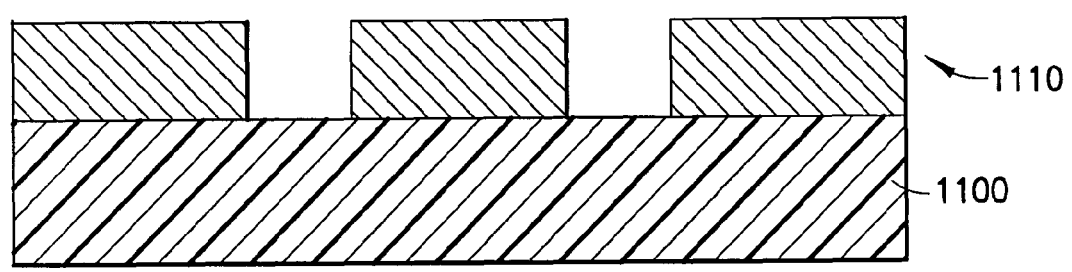

The photoresist 1110 is selectively exposed to a source of radiation in FIG. 48 such that regions 1112 of the photoresist 1110 undergo a chemical change that makes them more soluble in a developer material. In FIG. 49, the developer is applied to selectively remove the regions 1112 of the photoresist 1110 to expose portions of the underlying substrate 1100.

Figure 50:
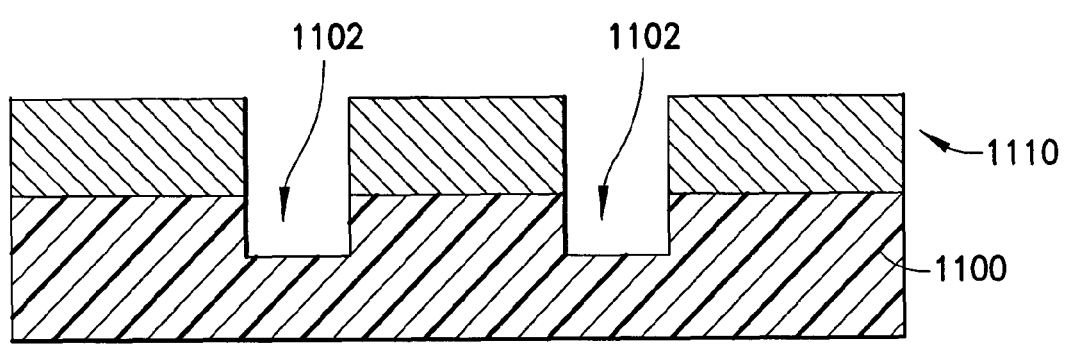
Figure 51:
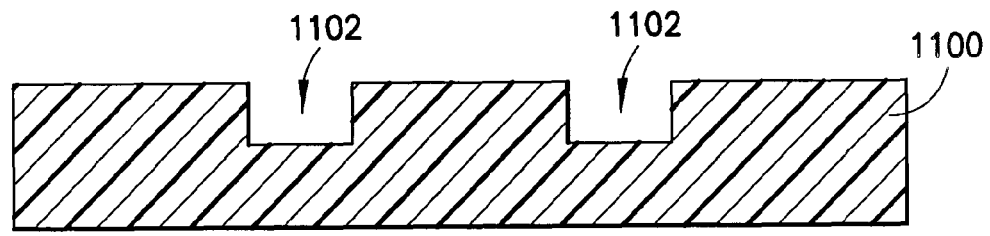

As shown in FIG. 50, the exposed portions of the substrate 1100 are then etched using any suitable method to form features 1102 (e.g., trenches, cutouts, channels, etc.) in the substrate 1100, after which the photoresist 1100 is stripped as shown in FIG. 51.

The features 1102 are intended to improve mass transfer in the adsorbent material while minimizing density loss within the material. Layers of adsorbent materials that included etched features such as those shown in FIG. 51 may be provided in contact with each other such that the features (e.g., channels) allow for mass transfer into and out of the adsorbent materials at select locations.

According to an exemplary embodiment, a plurality of channels is formed in at least one surface of an adsorbent material to allow mass transfer of the refrigerant fluid (e.g., gas). According to other exemplary embodiments, other configurations for the features may be used. The number, size, shape, spacing, configuration, and other characteristics of the etched features may vary depending on their desired performance characteristics and other features. According to one exemplary embodiment, the features have a relatively small size (e.g., between approximately 100 nanometers and 100 micrometers deep and between approximately 100 nanometers and 100 micrometers wide).

In various embodiments of the present invention, the adsorbent material (e.g., a carbon monolith, sheet, block, or other structure) may be produced that includes a non-uniform pore profile. Such a structure can provide an adsorbent material with a desired level of thermal conduction in one direction and a desired level of mass or material transport in another direction (e.g., a direction orthogonal to the first direction). Stated another way, the adsorbent can be manufactured to provide a material that allows for both relatively rapid thermal conduction and relatively fast transport of sorbent gases in a single adsorbent material.

In various embodiments, the size and/or number of pores may vary within the adsorbent material. For example, a gradient may be created between a first region and a second region within the material such that a smaller number of larger pores are formed in the first region and a larger number of smaller pores may be formed in the second region. According to an exemplary embodiment, there may be a gradual transition of pore sizes between the first and second regions.

Figure 52:
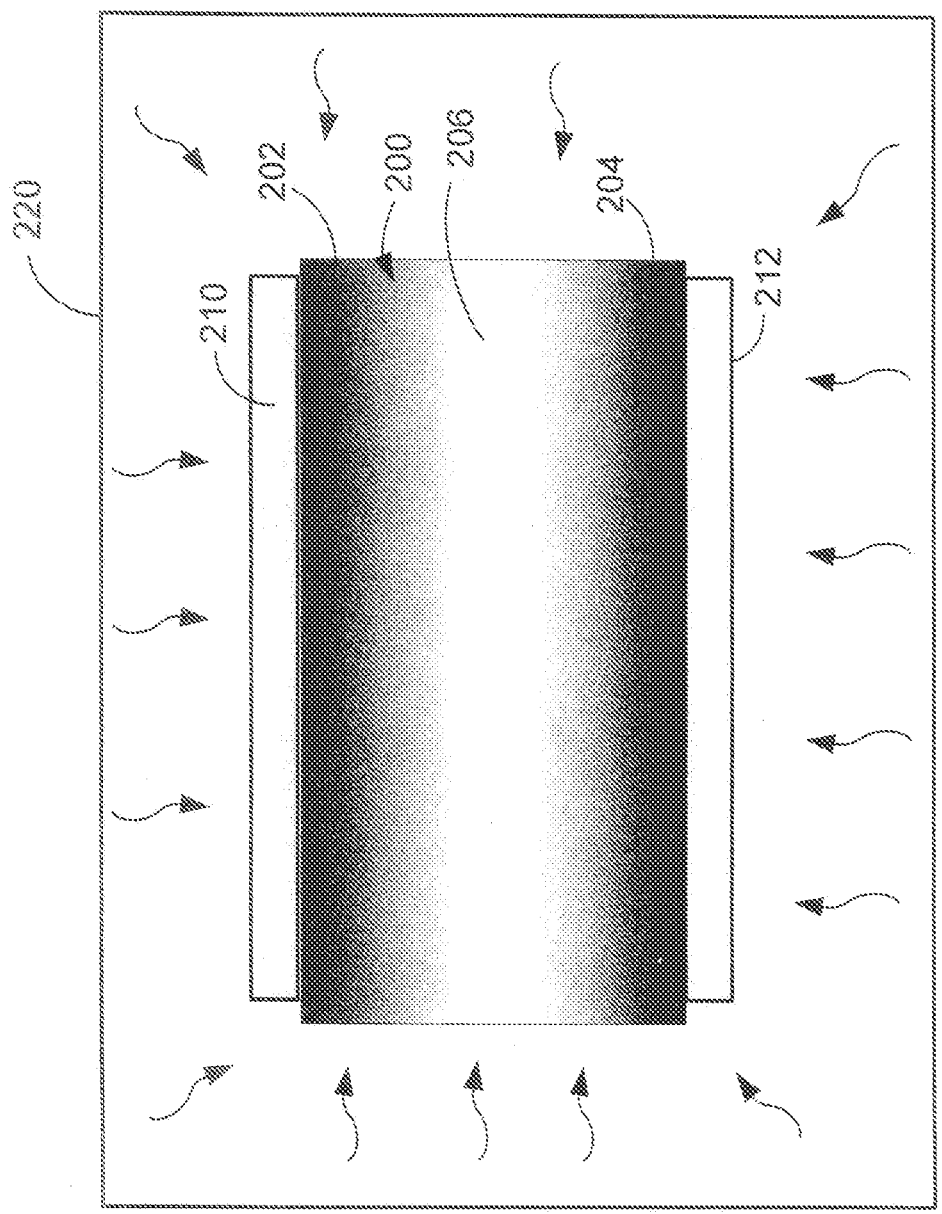
FIG. 52 is a schematic cross-sectional view of a material (e.g., a compressed polymeric material) provided within a heating chamber during a pyrolysis operation in which contact heating is used to control the formation of a pore profile within the material according to an exemplary embodiment.

FIG. 52 illustrates a substrate 200 formed from a compressed polymeric material according to one exemplary embodiment. As shown in FIG. 52, the substrate 200 is provided within a heating chamber or furnace 220 to undergo pyrolysis to form pores within the material and to activate the material (e.g., to allow it to adsorb material thereon through the use of molecular forces). Convection heat is applied to the block 200 as in conventional activated carbon formation methods, as illustrated by the curved arrows in FIG. 52.

In addition to the convective heat provided during pyrolysis of the substrate 200, one or more members or elements (shown as members 210, 212) in the form of plates, blocks, rods (or other suitable shapes) are provided in contact with one or more surfaces of the substrate 200 during pyrolysis. The members (e.g., members 210, 212) may be used to create a temperature gradient and/or regions of localized heating or cooling within the substrate 200, which may in turn result in the formation of a non-uniform pore profile throughout the substrate 200. Generally speaking, higher temperature regions within the substrate 200 would be expected to pyrolyze first and could either densify further or outgas the pyrolysis products through the lower temperature regions, thus creating smaller pores in the higher temperature regions. According to other exemplary embodiments, a temperature gradient may be formed within the furnace to create temperature gradients within the material either in addition to the members 210, 212 or in place of the members 210, 212.

According to an exemplary embodiment, the members 210, 212 are formed from a material such as a ceramic or metal material (e.g., Inconel 600) that is selected to provide relatively high thermal transfer between the members 210, 212 and the substrate without reaction with the workpiece.

According to an exemplary embodiment, the members 210, 212 are provided at a temperature greater than the temperature of the surrounding atmosphere within the chamber 220. For example, where the temperature of the chamber is between approximately 260 and 280 degrees Celsius, the members 210, 212 may be provided at a temperature of between approximately 300 and 340 degrees Celsius.

According to other exemplary embodiments, the temperatures of the chamber and of the members may be varied depending on any number of factors, including the desired pore profile to be created within the substrate 200.

As indicated schematically in FIG. 52 by the shading of the substrate 200, the size and/or shape of the pores within the substrate 200 vary from regions or locations 202, 204 that are near the members 210, 212 to a region or location 206 away from the members 210, 212 (shown as being in the center of the substrate 200). For example, according to an exemplary embodiment, relatively small pores having diameters of between approximately 0.5 and 1.0 nanometers may be formed in regions 202, 204 while relatively large pores having diameters of between approximately 1.5 and 4.0 nanometers or larger may be formed in region 206. It should be understood that contact heating methods may also produce different numbers of pores at select locations within the substrate 200.

The transition between regions within the substrate 200 (e.g., between region 206 and the regions 202, 204) may be relatively smooth transition or there may be a relatively abrupt change in pore size and/or shape at a predetermined distance from the members 210, 212 (e.g., at some distance away from the members 210, 212, the conductive heating may overcome the effects of the contact heating provided by the members 210, 212, resulting in relatively uniform pore size and/or shape within the substrate 200 except for in regions nearing the members 210, 212).

The size, shape, configuration, number, and temperature of the members provided in contact with one or more surfaces of the substrate during pyrolysis may vary according to various other exemplary embodiments. For example, more than one member may be provided in contact with a surface (or surfaces) of the substrate 200. The members may cover all or a defined portion of a given surface of the substrate 200.

While the members 210, 212 have been described as being provided at a temperature that exceeds the temperature within the chamber or furnace 220, according to other exemplary embodiments, the members 210, 212 may be provided at a temperature that is less than that of the surrounding atmosphere. Stated another way, the members may be responsible for the formation of a relatively cool zone within the substrate 200. It is expected that utilizing one or more members that are cooler than the surrounding atmosphere would have the reverse effect as would be expected for utilizing members having higher temperatures than the surrounding atmosphere (e.g., the creation of larger pores as compared to those at higher temperature regions within the substrate). According to still other exemplary embodiments, a combination of member(s) that locally cool portions of the substrate 200 and member(s) that locally heat portions of the substrate 200 may be used to obtain a desired pore profile within the substrate 200.

The size and/or shape of the pores at various locations within the substrate 200 may be varied according to various exemplary embodiments. For example, instead of using two members 210, 212 as shown in FIG. 52, a different number of members may be used. Altering the size, shape, position, and/or temperature of the members may also have an effect on the distribution of pores within the carbon block, as those reviewing this disclosure will appreciate.

Figure 53:
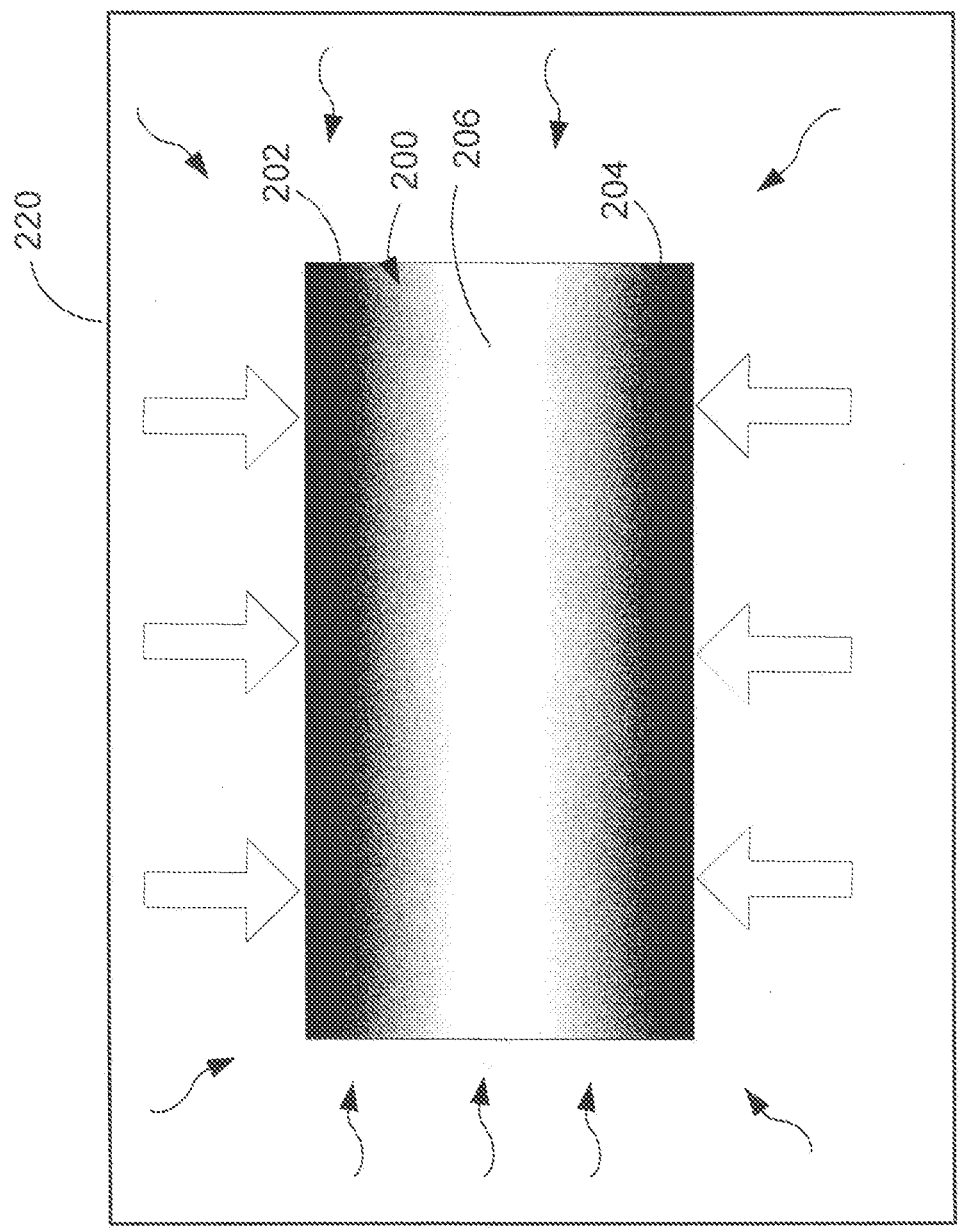
FIG. 53 is a schematic cross-sectional view of a material (e.g., a compressed polymeric material) provided within a heating chamber during a pyrolysis operation in which radiative heating is used to control the formation of a pore profile within the material according to another exemplary embodiment.
Figure 54:
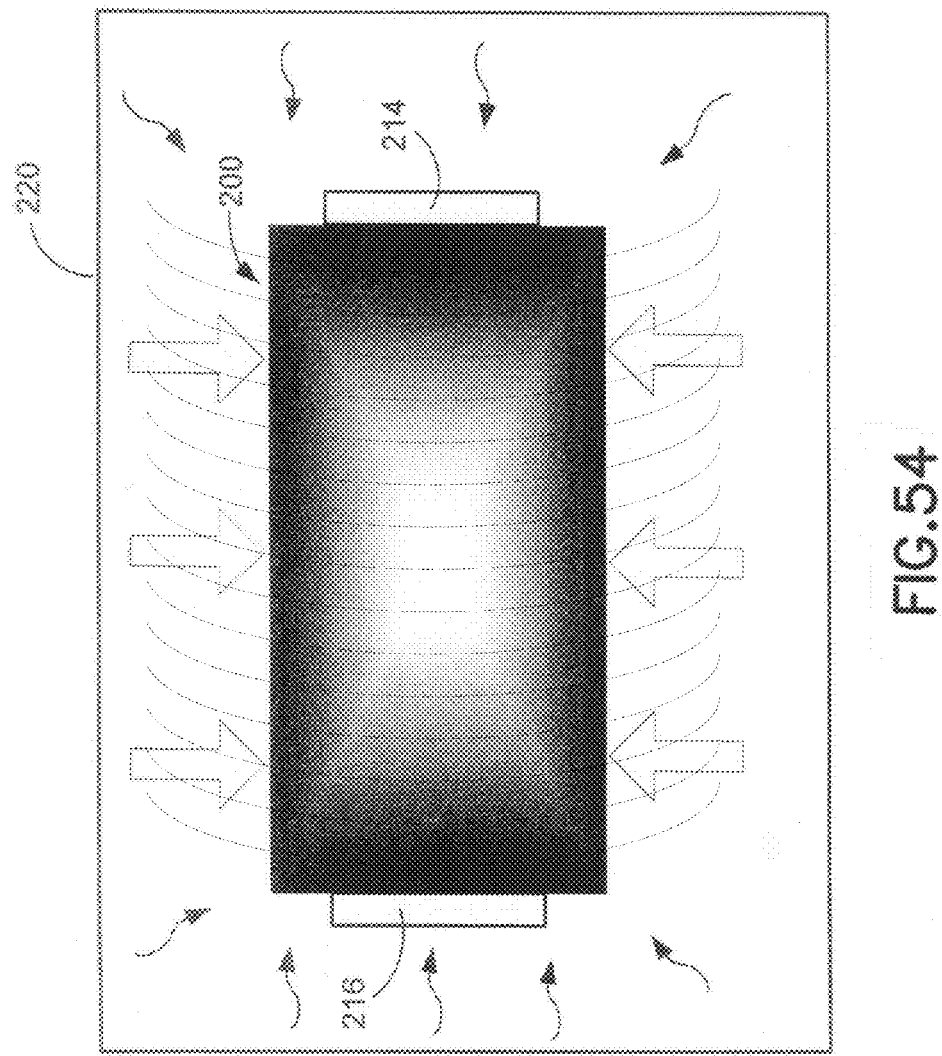
FIG. 54 is a schematic cross-sectional view of a material (e.g., a compressed polymeric material) provided within a heating chamber during a pyrolysis operation in which both contact and radiative heating are employed according to another exemplary embodiment.

In place of, or in addition to, the members 210, 212 described with respect to FIG. 52, directed radiative heating (e.g., using lasers, infrared heat sources, and/or microwave heating) may also be used during pyrolysis to form a non-uniform pore profile within the substrate 200, as shown in FIG. 6 and indicated by grey arrows. Such radiative heating may be localized or spread across all or a portion of one or more surfaces of the substrate 200. As shown in FIG. 53, the pore profile within the substrate 200 is similar to that produced using members 210, 212 as described with respect to FIG. 52. Other heating schemes may be utilized according to other exemplary embodiments to obtain any of a variety of pore profiles as may be desired (e.g., as shown in FIG. 54, in addition to radiative heating (as indicated by grey arrows), one or more portions of the substrate may have a member (e.g., members 214, 216) provided in contact therewith to heat or cool such portions and/or a strong magnetic field may be added during heating (as indicated by dashed lines)).

Radiative heating would allow for relatively rapid heating of the surface of the substrate and may be tailored to allow heat to penetrate to a predetermined area and/or depth within the substrate. The pulse intensity and duration of the radiative heating would allow control over the thermal profile developing in the workpiece. Because the method is non-contact, it can be used for complex shapes and allows the selective heating of regions within a face to create more complex temperature and thus pyrolysis responses. Porosity of a desired character can be created or formed at any selected location on and/or within the substrate, e.g., by pyrolysis, heating, flame spraying of particulate material, leaching of soluble material from a composite substrate including soluble as well as insoluble material, microabrasion processing, or any other suitable technique, before the remaining portions of the substrate in specific embodiments may or may not require such further processing, and can function as the porous member to form an integrated composite layer, although it is to be understood that multilayered composite structures are also contemplated within the broad scope of the present invention.

The contact and/or radiative heating as shown in FIGS. 52-53 may be performed concurrently with or subsequent to the convective heating according to an exemplary embodiment.

One advantageous feature of producing a non-uniform pore profile within the substrate 200 is that mass transfer of the substrate may be improved while still maintaining a reasonable number of locations for the refrigerant fluid (e.g., gas) to be stored. For example, it is believed that relatively large pores (e.g., pores having diameters of between approximately 1.5 and 4.0 nanometers or larger) are more suitable for allowing refrigerant fluid (e.g., gas) to quickly enter and exit the activated carbon material, while relatively small pores (e.g., pores having diameters of between approximately 0.5 and 1.0 nanometers) are better suited for storing the adsorbed refrigerant fluid (e.g., gas) once it is provided within the adsorbent material. In other words, the large pores are used to quickly cycle the refrigerant fluid (e.g., gas) into and out of the adsorbent material, while the small pores serve to store the refrigerant fluid (e.g., gas) once it is introduced into the adsorbent material through the larger pores. By controlling the location of the small and large pores within the material, it may be possible to provide a material optimized both for effective mass transfer while still retaining a relatively large capacity for the adsorbed refrigerant fluid (e.g., gas).

Post-pyrolyzation processing may optionally be performed to alter the internal structure of adsorbent material (e.g., blocks, sheets, monoliths, etc. of activated carbon or another suitable material). For example, the diffusivity or mass transfer characteristics of the adsorbent material may be modified by employing an additional thermal, mechanical, and/or chemical process. Such processing may be used in conjunction with adsorbent materials that have either uniform or non-uniform pore profiles.

Figure 55:
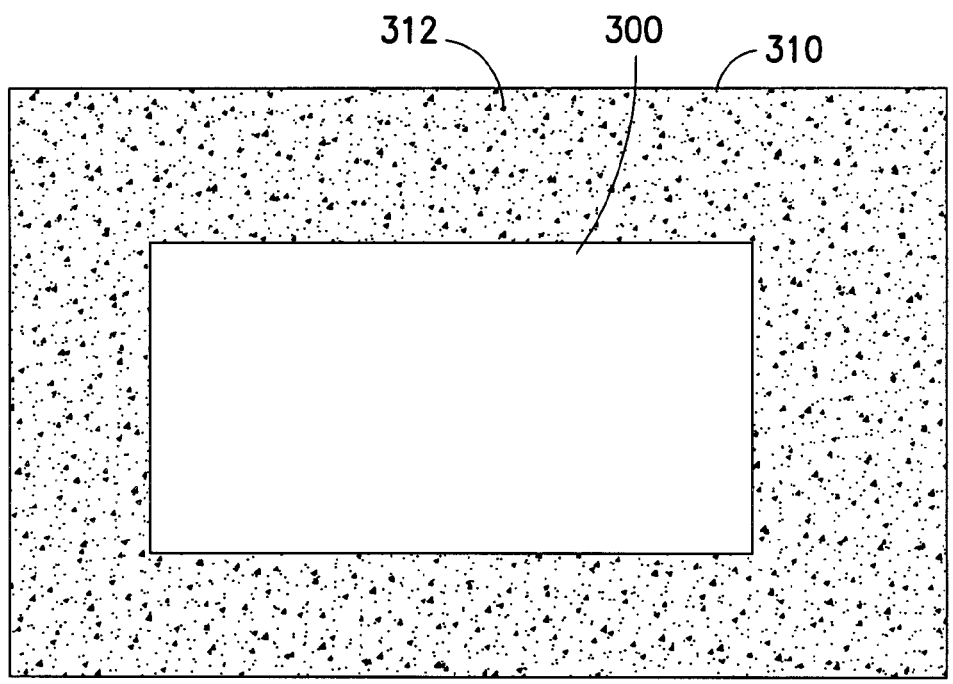
FIG. 55 is a schematic cross-sectional view of an adsorbent material undergoing a post-pyrolyzation treatment.

According to one exemplary embodiment, the adsorbent material (e.g., activated carbon) may be subjected to temperatures below approximately 0 degrees Celsius after introducing a vapor such as water vapor or a methanol vapor into the pores of the material. Other suitable vapors include polar molecules such as isopropyl alcohol. FIG. 55 illustrates an adsorbent material 300 in the form of a block or monolith of activated carbon or another suitable material provided within a container 310 in which a vapor 312 is provided (vapor shown as dots in container 310).

Upon freezing, the expansion of the vapor molecules may act to expand the size of the pores and/or to otherwise alter the internal structure of the activated carbon material. For example, according to an exemplary embodiment, the freezing of the water vapor may increase the size (e.g., diameter) of the pores. According to another exemplary embodiment, the freezing of the water vapor may effect other structural changes within the material such as altering the shape of the pores and/or the distance between adjacent pores.

The vapor may be introduced into the pores before the point when the activated carbon material is subjected to the below freezing temperatures, and may be removed from the pores in a subsequent heating operation in which the water is evaporated from the activated carbon material. Any suitable method may be used to introduce the vapor into the pores of the material. Further, elevated pressures may be used (e.g., by using a pressurized container and an inert gas atmosphere) to facilitate the introduction of the vapor into the material and/or to maintain the vapor in its desired location within the material until the freezing step may be accomplished.

According to an exemplary embodiment, the vapor is introduced generally uniformly throughout the adsorbent material. Subsequent freezing of the vapor may therefore act to alter the size, shape, and/or position of the pores on a relatively uniform basis throughout the material.

According to another exemplary embodiment, if the vapor is introduced into only select regions of the activated carbon material, it may be possible to controllably alter the pore structure of the adsorbent material in such regions (e.g., to only increase the pore sizes or otherwise alter the pore structure at select locations within the material). For example, one or more surfaces of the material may be covered or masked (see, e.g., optional masks 320, 322 in FIG. 56 covering two surfaces of the material 300 such that vapor is allowed to penetrate only the top, bottom, front, and rear surfaces of the adsorbent material) with a vapor-proof material such that vapor penetrates the material only at the uncovered or unmasked locations. In addition to or in place of the covering/masking step, the depth of penetration of the vapor into the material may be controlled by limiting the amount of vapor to which the material is exposed, controlling the temperature and/or pressure of the system such that the vapor freezes after a predetermined amount of time, and/or any other suitable method as may be now known or subsequently developed.

The pore structure of the adsorbent material may also be modified using materials which expand at increased temperatures. According to an exemplary embodiment, a gas with a strong dipole (e.g. $NH_3$) is adsorbed into the porous carbon monolith. The filled monolith is introduced into an RF source tuned to one of the absorbances of the gas, which causes it to heat up rapidly within the existing pore structure of the adsorbent material. The local pressure of the gas will increase with temperature and cause the pore structure to open up or some of the interconnections between pores to undergo mechanical fracture. The more open structure is expected to allow faster transport of gas but with limited reduction in the thermal conductive properties. Adding a strong magnetic field during the RF heating may act to confine the motion of the dipoles and cause the modification of pores to occur in preferential directions.

Another post-pyrolyzation process involves the use of a chemical treatment to increase the carbon adsorption capacity of the adsorbent material, which may be used in conjunction with adsorbent materials that have either uniform or non-uniform pore profiles and/or have undergone other post-pyrolyzation processing (e.g., having pores sizes and/or shapes modified using a frozen vapor such as described above or using other methods such as a post-pyrolyzation heat treatment).

According to an exemplary embodiment, all or a portion of the adsorbent material is modified to have functional groups formed therein (e.g., nitrogen-containing functional groups for enhancing the adsorption of ammonia or other suitable gases). One advantageous feature of providing functional groups within the adsorbent material is that the capacity of the adsorbent material will be increased on a per volume basis. This may be beneficial in particular in adsorbent materials in which all or a portion of the pores have relatively large sizes (e.g., between 1.5 and 4.0 nanometers or greater), since materials having fewer large pores have less adsorption area than materials having a greater number of smaller pores. By increasing the efficiency of the adsorption at the available sites in the adsorbent material, some of the capacity loss may be mitigated.

In the context of an activated carbon adsorbent material that is intended for use with an ammonia ($NH_3$) refrigerant, the capacity may be improved by modifying the carbon surface using nitrogen-containing precursors (e.g., $NH_3$, urea ($NH_2CONH_2$), and other organic and inorganic compounds containing nitrogen). Other suitable precursors may also be used to increase the affinity for $NH_3$ adsorption (e.g., oxygen-containing precursors such as ozone or an organic peroxide such as benzoyl peroxide). Further, according to other exemplary embodiments in which different adsorbent materials and/or different refrigerant gases are to be used, the surface modification of the adsorbent material may have different functional groups attached thereto.

To modify the surface of the individual pores of the adsorbent material to have functional groups formed thereon, the adsorbent material is heated to an elevated temperature (e.g., in a range of temperatures between room temperature and 2000 degrees Celsius, and more preferably between approximately 400 and 800 degrees Celsius, and most preferably between approximately 200 and 400 degrees Celsius) in the presence of the desired precursor (e.g., urea). The treatment can be conducted in a flowthrough (if the reacting species is in a vapor form under the conditions of the treatment) or a static system (e.g., by mixing the carbon and solid urea powder in a vessel and applying heat). The precursors can be introduced into the system either before heating the adsorbent material or during the heating process.

The step of modifying the surface of the pores of the adsorbent material using precursors provided at elevated temperatures may be performed either as part of the pyrolyzation process or subsequent to completion of the pyrolyzation process. For example, during the pyrolyzation process, a functional group containing gas may be introduced into the chamber such that the gas is introduced into the pores formed in the adsorbent material.

According to an exemplary embodiment, the precursor containing the desired functional group may be provided such that it penetrates relatively uniformly throughout the adsorbent material or may be introduced into only select locations of the adsorbent material to controllably improve the capacity of only select portions of the adsorbent material (e.g., using masking techniques and/or controlling the depth of penetration of the desired species into the adsorbent material).

Figure 56:
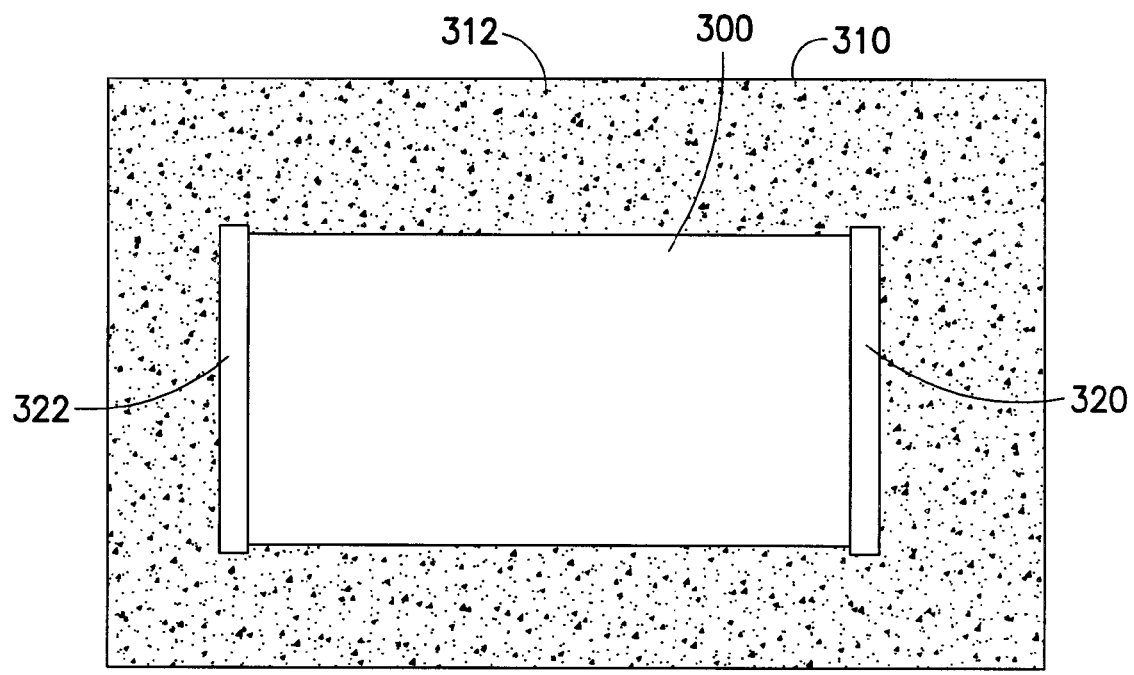
FIG. 56 is another schematic cross-sectional view of an adsorbent material undergoing a post-pyrolyzation treatment in which a portion of the adsorbent material is masked or covered.

It should be noted that FIGS. 55 and 56 may also be used to illustrate the use of a chemical treatment for modifying the capacity of the adsorbent material, where 312 represents the species containing the desired functional group precursor (as opposed to representing a vapor as described above).

Another chemical treatment that may be employed to alter the mass transfer characteristics of the adsorbent material is to remove residual material from within the adsorbent material. For example, where a carbon-containing material such as a polymer is used to form an activated carbon material, there may be some amount of residual carbon that remains within the pore structure. The residual material may act to slow the diffusion of refrigerant fluid (e.g., gas) through the pores (e.g., which may be analogous to the manner in which a road block would back up traffic on a city street).

According to an exemplary embodiment in which residual carbon material may be included within the pores (e.g., amorphous carbon), the residual carbon material may be removed by subjecting the adsorbent material to a low-temperature oxidation step in which the adsorbent material is heated to a temperature of between approximately 150 and 200 degrees Celsius in an oxygen-containing atmosphere. This oxidation step results in the formation of carbon/oxygen containing species such as carboxyl ($-CO_3H$) and phenolic ($-COH$) species. The carbon/oxygen containing species may then be removed from the adsorbent material using any suitable method (e.g., by heating the adsorbent material to a higher temperature of between approximately 700 and 900 degrees Celsius to cause decomposition of the species and CO and $CO_2$ gaseous molecules to be released from the carbon structure.

It should be appreciated by those reviewing this disclosure that the process of removing residual material from the pores of the adsorbent material may be used in conjunction with adsorbent materials that have either uniform or non-uniform pore profiles and/or have undergone other post-pyrolyzation processing (e.g., having pores sizes and/or shapes modified using a frozen vapor such as described above or using other methods such as a post-pyrolyzation heat treatment).

It should be noted that the concepts described herein may be combined in any suitable manner with each other. For example, an adsorbent structure may be produced using contact heating to modify the pore structure near a surface of the structure, and subsequent steps may be taken to further modify the pore structure as described herein.

The present invention therefore contemplates a variety of specific embodiments within its broad scope of implementation. Specific implementations of the invention include the illustrative embodiments that are described below.

One specific embodiment relates to an adsorption structure comprising: at least one adsorbent member formed of an adsorbent material; and at least one porous member provided in contact with a portion of the adsorbent member to allow gas to enter and exit the portion of the adsorbent member.

Such adsorption structure can further comprise at least one heat conductive member provided in contact with the adsorbent member and configured for transferring heat between the adsorbent member and a heat transfer fluid. The heat conductive member in such structure advantageously comprises a metal.

The aforementioned adsorption structure in another embodiment is arranged so that the adsorbent material comprises activated carbon, the at least one porous member comprises a porous metal, and the porous metal comprises a material selected from the group consisting of nickel, aluminum, copper, and alloys and combinations thereof. The porous metal in such structure in a specific implementation has a porosity of between approximately 25 and 60 percent.

In another implementation of the adsorption structure broadly described above, the at least one porous member comprises a porous metal plate provided in contact with at least one surface of the adsorbent member.

Another implementation of the adsorption structure broadly described above comprises a plurality of adsorbent members separated from each other by porous metal members.

A further implementation of the broadly described adsorption structure comprises a plurality of porous metal members incorporated into a matrix of adsorbent material.

A still further implementation of the broadly described adsorption structure further comprises a material provided within the adsorbent material to enhance the heat transfer characteristics of the adsorbent material, wherein the material for enhancing the heat transfer characteristics of the adsorbent material is a metal provided within the adsorbent member.

In such adsorption structure, the material for enhancing the heat transfer characteristics of the adsorbent material can be provided as a second phase within the adsorbent material. The material for enhancing the heat transfer characteristics of the adsorbent material in such structure can comprise a material selected from the group consisting of diamond-like carbon, diamond nanocrystals, diamond microcrystals, and carbon nanotubes. In another variation, the adsorption structure can be arranged with the material for enhancing the heat transfer characteristics of the adsorbent material comprising a plurality of substantially aligned fibers.

Another specific implementation the invention relates to a method for producing an adsorption structure comprising: providing a porous material in contact with a surface of an adsorbent material, the adsorbent material being configured to allow storage and transfer of a refrigerant fluid, whereby the porous material allows the refrigerant fluid to traverse the surface of the adsorbent material and providing at least one heat conductive member in contact with the adsorbent member, the heat conductive member being configured for transferring heat between the adsorbent material and a heat transfer fluid.

Such method may further comprise providing a material within the adsorbent material to enhance the heat transfer characteristics of the adsorbent material. The method may additionally comprise aligning the material for enhancing the heat transfer characteristics of the adsorbent material, wherein the aligning step utilizes an external magnetic field.

The adsorbent-based refrigeration system of the invention in a specific embodiment comprises: an adsorption structure comprising at least one adsorbent member, at least one porous member in contact with the at least one adsorbent member, and a heat conductive member provided in contact with the adsorbent member; wherein the heat conductive member is configured to transfer heat to and from the adsorbent member; and wherein the porous metal member is configured to allow refrigerant fluid to enter and exit the adsorbent material.

Such adsorbent-based refrigeration system may be arranged so that at least a portion of the porous member has a porosity of between approximately 25 and 40 percent.

Such adsorbent-based refrigeration system may also comprise a chamber cooled by refrigerant fluid.

In another implementation, the adsorbent-based refrigeration system described above utilizes an adsorbent member comprising at least one material selected from the group consisting of polyvinylidene chloride, phenol-formaldehyde resins, polyfurfuryl alcohol, coconut shells, peanut shells, peach pits, olive stones, polyacrylonitrile, and polyacrylamide, wherein the adsorbent member comprises nanopores, wherein the nanopores have a generally uniform pore size throughout the adsorbent member.

A further specific implementation of the invention relates to a method for producing an adsorbent material comprising: providing a first activated carbon precursor having a first density; providing a second activated carbon precursor having a second density in contact with the first activated carbon precursor to form a structure; and pyrolyzing the structure to form an adsorbent material that includes a plurality of pores therein, the adsorbent material comprising a first region corresponding to the first activated carbon precursor and a second region corresponding to the second activated carbon precursor; wherein at least one of the pore sizes and the pore distribution differ between the first region and the second region.

Such method may be further characterized by features including any one or more of the following: (i) the first and second activated carbon precursors are polymeric materials; (ii) the first and second activated carbon precursors are each formed of one or more materials selected from the group consisting of polyvinylidene chloride, phenol-formaldehyde resins, polyfurfuryl alcohol, coconut shells, peanut shells, peach pits, olive stones, polyacrylonitrile, polyacrylamide; (iii) the first region comprises pores having a first size and the second region comprises pores having a second size larger than the first size; (iv) the first density is greater than the second density; (v) the steps of providing the first and second activated carbon precursors comprise providing a first layer comprising the first activated carbon precursor and laminating a second layer comprising the second activated carbon precursor to the first layer; (vi) the steps of providing the first and second activated carbon precursors comprise providing the second activated carbon precursor within the first activated carbon precursor; and (vii) further comprising providing a third activated carbon precursor having a third density that differs from the first density and the second density before the pyrolyzing step.

Another specific implementation of the invention relates to a method of forming an adsorbent member comprising: forming a first polymeric member; forming a second polymeric member; providing the first polymeric member in contact with the second polymeric member, at least one of the first polymeric member and the second polymeric member being configured such that spaces are provided between the first polymeric member and the second polymeric member; and pyrolyzing the first member and the second member to form relatively small pores within the first member and the second member and to form larger pores at locations corresponding to the spaces.

Such method may be characterized by (i) the steps of forming the first and second polymeric members comprising molding or modifying the shape of the members, e.g., modifying the shape of the members comprising etching the members, or (ii) the steps of providing the first and second polymeric members comprising providing a plurality of additional polymeric members and compressing them to form a structure such spaces are formed within the structure.

The invention in another specific implementation relates to a method of forming an adsorbent member comprising: providing a member comprising a first material provided within a polymeric matrix; removing the first material; and pyrolyzing the member to form pores within the polymeric matrix.

In such method, the first material can be a sacrificial material, e.g., that is removed by step(s) comprising ashing or dissolving the first material. The first material can comprise aluminum, with the step of removing the first material comprising introducing hydrogen chloride gas into the polymeric material to form $AlCl_3$ gas. The step of removing the first material can be performed before, during or after the pyrolysis step.

A further specific implementation of the invention relates to an adsorbent material comprising: a first region having a first pore distribution; a second region having a second pore distribution; wherein the first region is formed from a first polymeric material having a first density and the second region is formed from a second polymeric material having a second density.

Such adsorbent material may be variously constituted, wherein the first polymeric material and the second polymeric material have the same composition, and/or wherein the first region includes larger pores than the second region, and/or wherein the first pore distribution has fewer pores per unit volume than the second region. The adsorbent material can comprise activated carbon. In a specific embodiment, the first polymeric material and the second polymeric material have the same composition.

The invention in a further aspect contemplates modification of the adsorbent by elevated pressure and elevated temperature treatment, for enhancement of fluid storage capacity of the adsorbent. Such elevated pressure and temperature treatment is continued for an extended period of time, e.g., a period of days in one embodiment, or in a range of from 6 to 170 hours in another embodiment, at pressure, temperature and duration conditions producing increased storage capacity for the sorbate fluid on the adsorbent.

Figure 57:
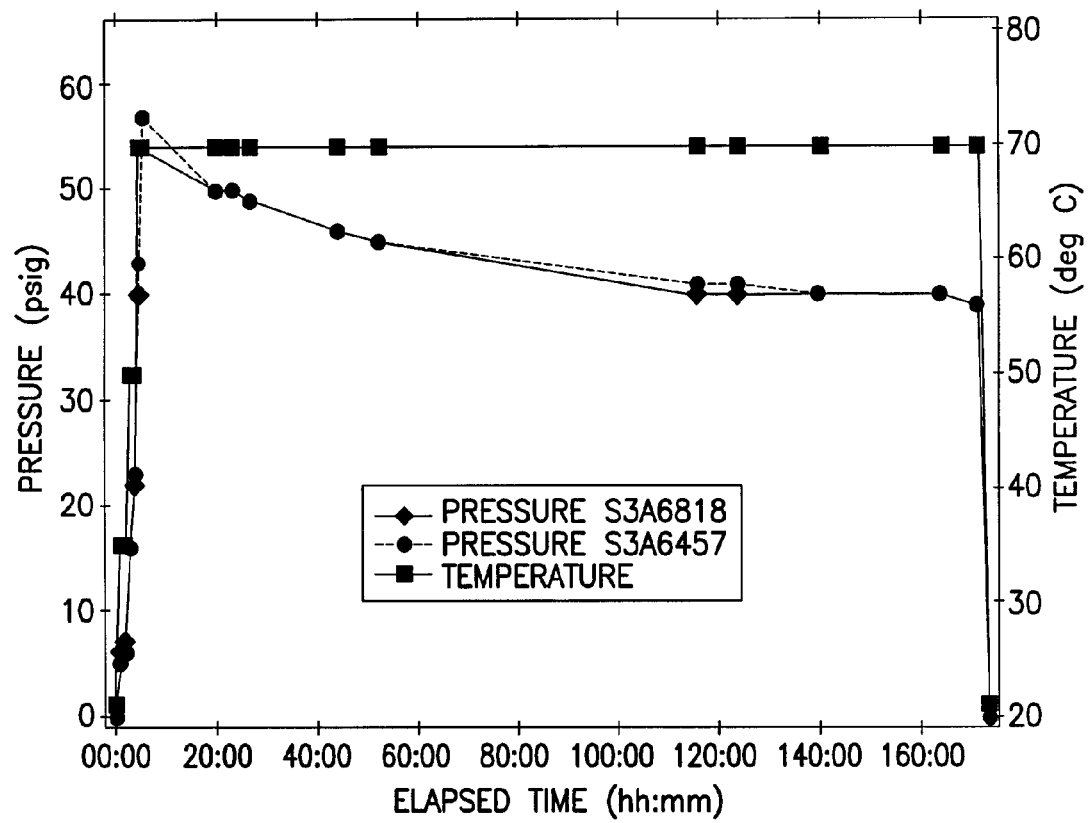
FIG. 57 is a graph of temperature and pressure as a function of time, for two adsorbent vessels containing carbon adsorbent and filled with arsine gas that have been subjected to elevated temperature and elevated pressure processing for extended duration of one week.

As an example of such processing and the enhancement in fluid storage capacity thereby achievable, two full JY cylinders filled with arsine were treated over a period of one week at elevated temperature and pressure, resulting in modification of the carbon adsorbent material to increase fluid uptake by such adsorbent material. In this illustrative embodiment, the initial fluid delivery pressures for the two cylinders were 673 Torr (cylinder A) and 634 Torr (cylinder B), respectively. These cylinders then were placed in an oven and the temperature was slowly raised to 70° C. and maintained that such level for one week. Such increase in temperature also produced increased pressure in the cylinders. Both the pressure inside the cylinders and the temperature of the oven were monitored as a function of time. The resulting data are plotted in FIG. 57, which is a graph of oven temperature and cylinder pressures, as a function of time. Cylinder A in the graph is denoted by the serial number S3A6457, and cylinder B in the graph is denoted by the serial number S3A6818. The temperature curve in the graph shows an oven temperature of 70° C. as being maintained over the timeframe of 6 to 172 hours. After an elapsed time of approximate five hours, the internal pressure within cylinder A was on the order of 57 psig, while the internal pressure within cylinder B was on the order of 54 psig, and for the majority of the test duration, the pressure levels in the respective cylinders were closely aligned with one another. It will be recognized that the elevated temperature can be widely varied in such processing, e.g., a temperature in a range of from 40° C. to 100° C. can be employed, with the closed vessel containing the sorbate gas environment as a result increasing the internal pressure of the vessel, e.g., in a range of from 10% to 500% in relation to the pressure at ambient (e.g., 25° C.) conditions.

After being maintained at such elevated temperature and pressure conditions, the respective cylinders were cooled to room temperature and the delivery pressure of the contained gas was measured for each cylinder. Cylinder A exhibited a delivery pressure of 461 Torr and cylinder B exhibited a delivery pressure of 452 Torr. These values were approximately 30% lower than the original delivery pressures of these cylinders. Both cylinders then were allowed to sit at room temperature under subatmospheric pressure conditions for another 21 days. Under these conditions, the delivery pressure for cylinder A further decreased to 353 Torr.

A decrease in delivery pressure from approximately 650 Torr down to 450 Torr corresponds to approximately 55 additional grams of arsine adsorbed on the carbon adsorbent, while a decrease from approximately 650 Torr to 353 Torr corresponds to an additional 96 grams of arsine adsorbed on the carbon adsorbent.

The results from elevated temperature and pressure processing of the cylinders suggests that such conditions allow the gas to gain access to sorptive sites in the adsorbent that were previously unavailable to the gas prior to such processing. While we do not wish to be bound by any theory or explanation as regards the substantial increase in adsorbent capacity mediated by such elevated temperature and pressure processing, it may be that the elevated temperature and pressure conditions act to expand the pore volumes in the adsorbent.

Next, cylinder A was evaluated to determine if the increased loading of arsine gas could be removed in subsequent dispensing operation. For this purpose, the amount of deliverable gas was measured over a pressure range of dispensing, from 353 Torr down to 25 Torr. The results are shown in Table 2 below, in which cylinder A is compared to a typical arsine-filled carbon adsorbent-containing JY cylinder of a type commercialized by ATMI, Inc. (Danbury, Conn., USA) under the trademark SDS3

TABLE 2

| Typical SDS3 JY Arsine Cylinder | | Test Cylinder A | | |
|---|---|---|---|---|
| Deliverables at 21 deg C. (g) | Cylinder Pressure (Torr) | Deliverables (g) | Cylinder Pressure (Torr) | Cylinder Temperature (deg C.) |
| 321 | 100 | 0 | 353 | 18.3 |
| 370 | 80 | 11 | 333 | 19.7 |
| 434 | 60 | 126 | 167 | 19.5 |
| 476 | 50 | 225 | 108 | 20.5 |
| 592 | 30 | 335 | 55 | 19.9 |
| 682 | 20 | 409 | 45 | 20.9 |
| 822 | 10 | 454 | 25 | 19.7 |

These data show that cylinder A delivers less arsine gas than the typical SDS3 arsine cylinder, thereby indicating that the additional arsine loaded on the carbon adsorbent in cylinder A was not easily removed, and that the adsorbent changes that occurred upon heating and pressurizing the adsorbent were reversed when the cylinder was allowed to depressurize and cool back to room temperature. The invention contemplates the use of elevated temperature/pressure treatment to avoid this circumstance, and to permanently alter the structure of the carbon adsorbent so that both increased uptake of sorbate gas as well as increased deliverables are achieved. In addition, the invention contemplates the use of elevated temperature in the dispensing operation, so that that the additional sorbate loaded on the carbon adsorbent by elevated temperature/pressure treatment is subsequently thermally desorbed in such dispensing operation, whereby the benefits of higher adsorbent loading are correspondingly realized in subsequent dispensing operation.

It will be recognized that the specific elevated temperature and pressure conditions useful for increasing the loading capacity of the carbon adsorbent may be readily determined, within the skill of the art, by empirical determinations in which the temperature and pressure as well as the duration of elevated temperature/pressure maintenance are varied, to determine the specific combination of process conditions that achieves a desired loading on a specific carbon adsorbent, and that corresponding dispensing conditions may be analogously determined by empirical determination.

The invention therefore contemplates a method of increasing a loading capacity of the carbon adsorbent for a sorbate gas, comprising maintaining the carbon adsorbent at elevated temperature and pressure conditions in a sorbate gas environment, for sufficient time to increase loading of the sorbate gas on the carbon adsorbent. The invention also contemplates such a method, wherein adsorbed sorbate gas is subsequently desorbed from the carbon adsorbent under elevated temperature desorption conditions.

While the invention has been described herein with reference to refrigerant fluid as illustratively being in gaseous form, it will be appreciated that the invention is intended to encompass various fluid forms of the refrigerant medium, including liquids, gases, liquid/gas mixtures, etc. The refrigerant can comprise any suitable refrigerant material, including single component as well as multicomponent materials. In various embodiments, the refrigerant can comprise ammonia, water, halocarbons, glycols, alcohols (e.g., methanol, ethanol, isopropanol, etc.), hydrocarbons (e.g., butane, propane, etc.), amines, polyamines, or any other material that can be usefully employed within the broad practice of the present invention, in specific embodiments thereof.

The construction and arrangement of the components of the adsorption systems as shown in the various exemplary embodiments herein is illustrative only. Although only a few embodiments have been described in detail in this disclosure, those skilled in the art will readily appreciate that many modifications are possible (e.g., variations in sizes, dimensions, structures, shapes and proportions of the various elements, values of parameters, mounting arrangements, use of materials, colors, orientations, etc.) without materially departing from the novel aspects of the present invention. For example, elements shown as integrally formed may be constructed of multiple parts or elements, the position of elements may be reversed or otherwise varied, and the nature and/or number of discrete elements or positions may be altered or varied. The order or sequence of any process or method steps can be varied or re-sequenced in alternative embodiments. Other substitutions, modifications, changes and omissions may be made in the design, operating conditions and arrangement of the various exemplary embodiments without departing from the scope of the present invention.

The invention claimed is:

1. An adsorption structure comprising: at least one adsorbent member formed of an adsorbent material; at least one heat conductive member provided in contact with the adsorbent member and configured for transferring heat between the adsorbent member and a heat transfer fluid; and at least one porous member provided in contact with a portion of the adsorbent member to allow gas to enter and exit the portion of the adsorbent member.

2. The adsorption structure of claim 1, wherein the adsorbent material comprises activated carbon, wherein the at least one porous member comprises a porous metal, and wherein the at least one heat conductive member comprises a metal.

3. The adsorption structure of claim 1, further comprising a material provided within the adsorbent material to enhance the heat transfer characteristics of the adsorbent material, wherein the material for enhancing the heat transfer characteristics of the adsorbent material comprises an enhancement material selected from the group consisting of (i) a metal provided within the adsorbent member; (ii) a second phase within the adsorbent material; (iii) diamond-like carbon; (iv) diamond nanocrystals; (v) diamond microcrystals; (vi) carbon nanotubes; and (vii) a plurality of aligned fibers.

4. A method for producing an adsorption structure of claim 1, said method comprising: providing a porous material in contact with a surface of an adsorbent material, the adsorbent material being configured to allow storage and transfer of a refrigerant fluid, whereby the porous material allows the refrigerant fluid to traverse the surface of the adsorbent material and providing at least one heat conductive member in contact with the adsorbent member, the heat conductive member being configured for transferring heat between the adsorbent material and a heat transfer fluid.

5. The method of claim 4, further comprising enhancing the heat transfer characteristics of the adsorbent material, by at least one step selected from the group consisting of (i) providing a material within the adsorbent material to enhance the heat transfer characteristics of the adsorbent material, and (ii) effecting heat transfer-enhancing alignment within the adsorbent material utilizing an external magnetic field.

6. An adsorbent-based refrigeration system comprising: an adsorption structure according to claim 1, wherein the porous member is configured to allow refrigerant fluid to enter and exit the adsorbent material.

7. The adsorbent-based refrigeration system of claim 6, further comprising a chamber cooled by refrigerant fluid.

8. The adsorbent-based refrigeration system of claim 6, wherein the adsorbent member comprises at least one material selected from the group consisting of polyvinylidene chloride, phenol-formaldehyde resins, polyfurfuryl alcohol, coconut shells, peanut shells, peach pits, olive stones, polyacrylonitrile, and polyacrylamide, wherein the adsorbent member comprises nanopores, wherein the nanopores have a generally uniform pore size throughout the adsorbent member.

9. The method of claim 4, wherein the adsorbent member is formed by a process comprising: forming a first polymeric member; forming a second polymeric member; providing the first polymeric member in contact with the second polymeric member, at least one of the first polymeric member and the second polymeric member being configured such that spaces are provided between the first polymeric member and the second polymeric member; and pyrolyzing the first member and the second member to form relatively small pores within the first member and the second member and to form larger pores at locations corresponding to the spaces.

10. The method of claim 4, wherein the adsorbent member is formed by a process comprising: providing a member comprising a first material provided within a polymeric matrix; removing the first material; and pyrolyzing the member to form pores within the polymeric matrix.

11. The method of claim 10, wherein the method is characterized by at least one characteristic selected from the group consisting of: (i) the first material being a sacrificial material; (ii) the step of removing the first material comprising ashing or dissolving the first material; (iii) the first material comprising aluminum and the step of removing the first material comprising introducing hydrogen chloride gas into the polymeric material to form $AlCl_3$ gas; (iv) the step of removing the first material being performed during the pyrolysis step; (v) the step of removing the first material being performed after the pyrolysis step; and (vi) the step of removing the first material being performed before the pyrolysis step.

12. A method for producing an adsorbent material, the method comprising: providing a first activated carbon precursor having a first density; providing a second activated carbon precursor having a second density in contact with the first activated carbon precursor to form a structure; and pyrolyzing the structure to form an adsorbent material that includes a plurality of pores therein, the adsorbent material comprising a first region corresponding to the first activated carbon precursor and a second region corresponding to the second activated carbon precursor; wherein at least one of the pore sizes and the pore distribution differ between the first region and the second region.

13. The method of claim 12, wherein the method is characterized by at least one characteristic selected from the group consisting of: (i) the first and second activated carbon precursors being polymeric materials; (ii) the first and second activated carbon precursors being selected from the group consisting of polyvinylidene chloride, phenol-formaldehyde resins, polyfurfuryl alcohol, coconut shells, peanut shells, peach pits, olive stones, polyacrylonitrile, and polyacrylamide; (iii) the first region comprising pores having a first size and the second region comprising pores having a second size larger than the first size; (iv) the first density being greater than the second density; (v) the steps of providing the first and second activated carbon precursors comprising providing a first layer comprising the first activated carbon precursor and laminating a second layer comprising the second activated carbon precursor to the first layer; (vi) the steps of providing the first and second activated carbon precursors comprising providing the second activated carbon precursor within the first activated carbon precursor; and (vii) further comprising providing a third activated carbon precursor having a third density that differs from the first density and the second density before the pyrolyzing step.

14. An adsorbent material in an adsorption structure comprising: at least one adsorbent member formed of an adsorbent material; and at least one porous member provided in contact with a portion of the adsorbent member to allow gas to enter and exit the portion of the adsorbent member, said adsorbent material comprising: a first region having a first pore distribution; a second region having a second pore distribution; wherein the first region is formed from a first polymeric material having a first density and the second region is formed from a second polymeric material having a second density.

15. The adsorbent material of claim 14, wherein the first polymeric material and the second polymeric material have the same composition, and/or wherein the first region includes larger pores than the second region, and/or wherein the first pore distribution has fewer pores per unit volume than the second region.

16. The adsorbent material of claim 14, wherein the adsorbent material comprises activated carbon.

17. The adsorbent material of claim 14, wherein the first polymeric material and the second polymeric material have the same composition.

* * * * *